United States Patent
Vanneman et al.

(10) Patent No.: US 7,373,725 B1
(45) Date of Patent: May 20, 2008

(54) SURVEYING SYSTEMS AND METHODS FOR DETECTING AND MEASURING CHANGES IN ELEVATION

(75) Inventors: Robert W. Vanneman, Bend, OR (US); Robert J. Blick, Rohnert Park, CA (US)

(73) Assignee: Laserline Mfg., Inc., Redmond, OR (US)

( * ) Notice: Subject to any disclaimer, the term of this patent is extended or adjusted under 35 U.S.C. 154(b) by 47 days.

(21) Appl. No.: 11/255,280

(22) Filed: Oct. 20, 2005

(51) Int. Cl.
*G01C 15/06* (2006.01)
(52) U.S. Cl. .......................................... 33/293; 33/294
(58) Field of Classification Search ................. 33/290, 33/292–296, 706–707
See application file for complete search history.

(56) References Cited

U.S. PATENT DOCUMENTS

| | | | |
|---|---|---|---|
| 4,029,415 A | 6/1977 | Johnson | |
| 4,030,832 A | 6/1977 | Rando et al. | |
| 4,240,208 A | 12/1980 | Pehrson | |
| 4,653,910 A | 3/1987 | Poling | |
| 4,673,287 A | 6/1987 | Rickus | |
| 4,676,634 A | 6/1987 | Petersen | |
| 4,730,920 A | 3/1988 | Schlemmer et al. | |
| 5,461,473 A * | 10/1995 | Pratt et al. ..................... | 33/293 |
| 5,537,201 A | 7/1996 | Kumagai et al. | |
| 5,551,159 A | 9/1996 | Mooty | |
| 5,887,354 A | 3/1999 | Nagao | |
| 5,894,344 A | 4/1999 | Tamez et al. | |
| 6,011,628 A | 1/2000 | Tullis | |

(Continued)

OTHER PUBLICATIONS

Apache Technologies, Inc., "Hawkeye™ Laser Receiver / Detector," downloaded from http://www.contractorstools.com/apache_detector_hawkeye.html, 2 pp. (document marked Dec. 13, 2004).
Apache Technologies, "Machine Control Laser Receiver," downloaded from http://yoas.net/apache.htm, 6 pp. (document marked Dec. 13, 2004).
Latec Instruments Inc., "Hand-Held Laser Receivers," downloaded from http://www.latec.on.ca/infopages/handheldreceivers.html, 4 pp. (document marked Dec. 13, 2004).
Smart Grade Incorporated, Brochure for "Smart Stik™ 1000," 2 pp. (published at least as early as Oct. 19, 2004).

*Primary Examiner*—Yaritza Guadalupe-McCall
(74) *Attorney, Agent, or Firm*—Theodore W. Baker

(57) ABSTRACT

Disclosed herein are representative embodiments of grade rods, grade-rod readers, and combinations thereof. In one exemplary embodiment, a grade rod is provided that has a reference surface extending along at least a portion of the rod. The reference surface includes two or more reference indicators spaced at substantially even intervals from one another. A reader unit is mounted to the rod (for example, slidably mounted). The reader unit includes one or more sensors positioned proximate to at least a portion of the reference surface of the rod. The sensors of this embodiment are configured to detect the motion of at least one of the two or more reference indicators relative to the sensors as the reader unit is moved along the reference surface. Other grade rod and grade-rod reader embodiments, as well as methods for using such embodiments, are also disclosed.

35 Claims, 20 Drawing Sheets

U.S. PATENT DOCUMENTS

| | | |
|---|---|---|
| 6,166,802 A | 12/2000 | Kodaira et al. |
| 6,167,629 B1 | 1/2001 | Chiba |
| 6,172,742 B1 | 1/2001 | Yamazaki |
| 6,819,113 B2 | 11/2004 | von Wimmerspeg |
| 6,845,912 B2 | 1/2005 | Scannell |
| 7,190,439 B2 * | 3/2007 | Burkhart, Jr. .............. 356/4.08 |
| 7,251,899 B2 * | 8/2007 | Yandrick et al. ............... 33/294 |
| 2007/0289152 A1 * | 12/2007 | Zeng et al. ................... 33/293 |

* cited by examiner

FIG. 20
FIG. 21
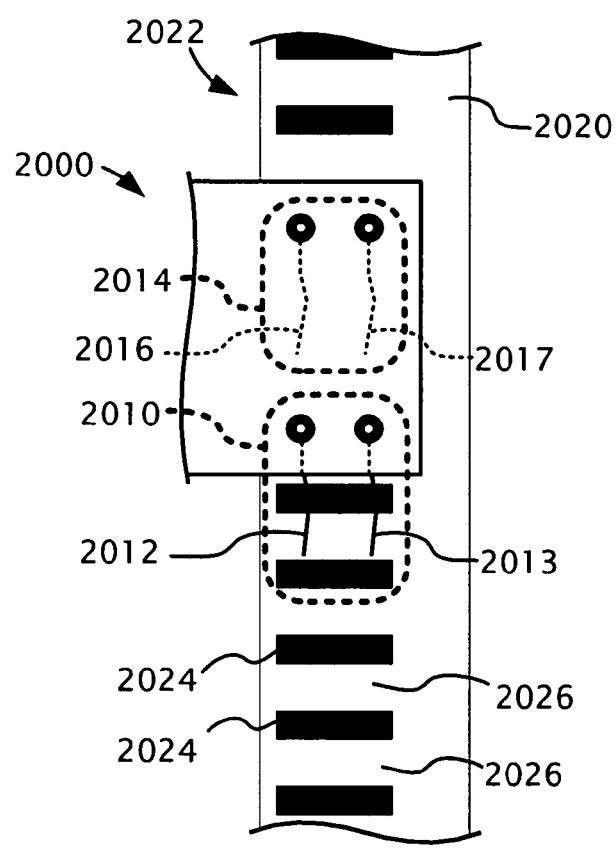
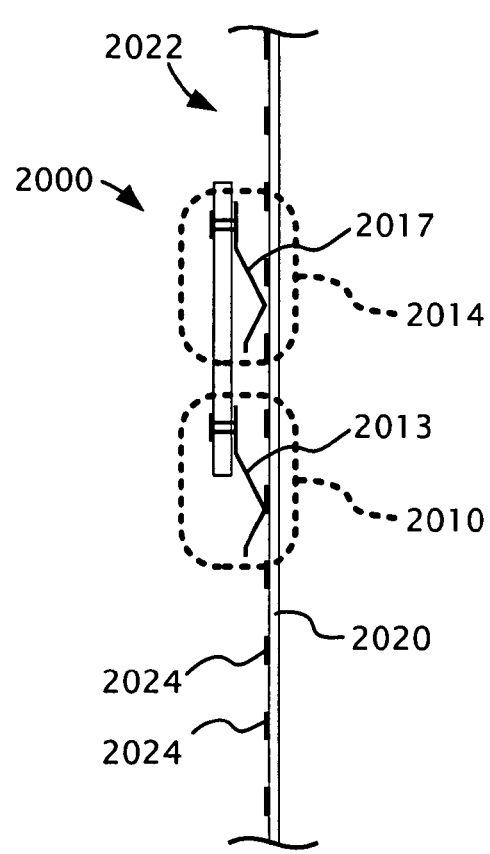

SURVEYING SYSTEMS AND METHODS FOR DETECTING AND MEASURING CHANGES IN ELEVATION

FIELD

This application relates generally to grade rods and grade-rod readers as can be used in surveying.

BACKGROUND

Grade rods (sometimes referred to as measuring sticks or surveyor's rods) are typically used by surveyors, civil engineers, or construction workers to measure elevations or vertical distances at a job site. Conventional grade rods typically have visual measurement markers (numbers and associated standardized markings) printed directly on the exterior of the rod or on tape (for example, a band or strip) associated with the exterior of the rod. Thus, a conventional grade rod operates much like an ordinary ruler or measuring tape. Depending on the particular application for which the grade rod is used, the unit of measure indicated by the grade rod may vary. For example, the measurement provided by a grade rod may be in imperial units (for example, feet, inches, and fractions of an inch), metric units (for example, meters and centimeters), or derivations thereof (for example, feet, tenths of feet, and hundredths of feet). Further, the distance being measured by a grade rod may have a variety of formats. For example, the measurement being made with a grade rod may be the true elevation of a point from sea level, the elevation above or below a known reference elevation, or the elevation of a point above or below a "zero" point on the grade rod (sometimes referred to as the cut-and-fill value).

A laser detector and laser light source are typically used in connection with a grade rod in order to provide accurate measurements relative to a reference plane. For example, the laser light source (such as a rotating laser light source) can emit a plane of light that defines a reference plane at a known elevation. Depending on the application, the reference plane may be level or sloping. A laser detector that is coupled to the grade rod and that is configured to be moved up and down the grade rod can provide an indication (such as an audible and/or visual signal, which is sometimes referred to herein as the "on-grade signal") when the reference plane is incident with a particular point of the laser detector.

In conventional operation, the base of the grade rod is placed at a known elevation (for example, a finish floor or sub grade). The laser detector is then positioned on the grade rod (for example, moved upwards or downwards along the rod) so that the "on-grade" signal is emitted or displayed. The operator then notes the elevation on the grade rod where the "on-grade" signal occurred. This measurement represents the base value or reference elevation. The grade rod is then moved to another location, and the process repeated until the "on-grade" signal is emitted or displayed on the laser detector. The difference between the location of the laser detector on the grade rod at the new location and the reference elevation is then calculated to determine whether the new location is too high or too low relative to the desired elevation and by how much. With conventional survey systems, this calculation is performed manually. The manual calculation of these grade values can be tedious, time-consuming, and prone to error. Accordingly, improved surveying systems that reduce the amount of manual computation while maintaining or improving accuracy are desired.

SUMMARY

Disclosed below are representative embodiments of grade rods, grade-rod readers, and combinations thereof that should not be construed as limiting in any way. Instead, the present disclosure is directed toward all novel and nonobvious features and aspects of the various disclosed embodiments, alone and in various combinations and subcombinations with one another. The disclosed technology is not limited to any specific aspect or feature, or combination thereof, nor do the disclosed embodiments require that any one or more specific advantages be present or problems be solved. Certain embodiments of the disclosed technology, for example, concern grade rods, grade-rod readers, and combinations thereof that can measure, compute, and/or report elevation differences automatically.

In one exemplary embodiment, a surveying system is disclosed comprising an elongated rod having a first end and a second end opposite the first end. The elongated rod of this embodiment further comprises a reference surface that extends along at least a portion of the rod between the first end and the second end. The reference surface includes two or more reference indicators spaced at substantially even intervals from one another. The surveying system of this embodiment additionally comprises a reader unit mounted to the rod (for example, slidably mounted). The reader unit includes one or more sensors positioned proximate to at least a portion of the reference surface of the rod. The sensors of this embodiment are configured to detect the motion of at least one of the two or more reference indicators relative to the sensors when the reader unit is moved relative to the reference surface. At least two of the sensors can be offset relative to one another. Further, at least two of the reference indicators can be substantially identical to one another. In some implementations, the reference surface is integrally coupled to the rod, whereas in other implementations, the reference surface is on tape associated with the rod. For example, in one embodiment, the tape can extend between two rollers associated with the rod. Furthermore, the rod can comprise a telescoping rod having a front-rod section movable relative to a rear-rod section. A laser detector can be included within the reader unit or provided separately from the reader unit. For example, in the telescoping rod embodiment, the laser detector can be slidably mounted on the front-rod section. Furthermore, in embodiments in which the reference surface comprises tape extending between two rollers, the laser detector can be coupled to the tape so that movement of the laser detector along the rod causes movement of the tape on the rollers. The reader unit can additionally comprise processing circuitry configured to receive signals from the one or more sensors and to compute therefrom an extent of motion of the reader unit on the grade rod from a reference position. Further, the reader unit can be additionally configured to compute and display a new position of the grade-rod reader relative to the reference position after the grade-rod reader is moved. In certain implementations, the sensors are optical sensors. For example, the optical sensors can be reflective optical sensors, in which case the reference indicators can comprise regions of the reference surface having a substantially different contrast than adjacent regions of the reference surface. Alternatively, the optical sensors can be transmissive optical sensors, in which case the reference indicators can comprise regions of the reference surface that are at least partially translucent. In other implementations, the sensors are electromagnetic sensors. For example, the electromagnetic sensors can be configured to detect capacitive couplings formed between the electromagnetic sensors and the reference indicators on the reference surface. In this implementation, the reference indicators comprise regions of the reference surface that produce a higher capacitive coupling with an active region of the sensors than produced by adjacent regions of the reference surface. Alternatively, the electromagnetic sensors can respectively comprise two or more contact elements that physically contact the reference surface and produce a voltage change in the sensors whenever the contact elements touch a respective reference indicator of the reference surface. In this implementation the reference indicators comprise regions of the reference surface that have a higher conductivity than adjacent regions of the reference surface.

Another exemplary embodiment comprises a reader apparatus configured to engage a grade rod such that the reader apparatus can be moved relative to a reference surface of the grade rod (for example, via a tongue-and-groove configuration). In this embodiment, two or more electromagnetic sensors are located in a sensor region of the reader apparatus. The two or more electromagnetic sensors of this embodiment are configured to detect electromagnetic couplings periodically formed between the sensors and respective reference indicators disposed on the reference surface as the reader apparatus is moved relative to the reference surface. In certain implementations, the reference indicators on the reference surface are substantially identical to one another. Further, in some implementations, the reference indicators can comprise conductive regions evenly distributed on the reference surface. The reference indicators can also comprise raised regions of the reference surface that are relatively closer to the electromagnetic sensors than adjacent regions of the reference surface when the reader apparatus is engaged with the grade rod. In some implementations of the device, at least two of the electromagnetic sensors are offset relative to one another. For example, the amount of the offset can be approximately a quarter of the repeat length between adjacent reference indicators. The device can further include a processing unit located in the reader apparatus and electrically coupled to the two or more electromagnetic sensors. The processing unit can be configured to determine an extent and direction of motion of the reader apparatus relative to the reference surface based at least in part on the signals received from the two or more electromagnetic sensors. The processing unit can be further configured to convert and display the extent of the motion relative to a reference value in a user-selected unit of measure. In some implementations, the device further includes a laser-detection system located in a housing of the reader apparatus. The laser-detection system can be configured to detect a reference laser beam incident on a fixed location of the housing.

Another exemplary embodiment comprises a reader apparatus configured to engage a grade rod such that the reader apparatus can be moved relative to a reference surface of the grade rod. The reference surface of the grade rod of this embodiment includes a plurality of evenly displaced reference features. Two or more optical sensors are located in a sensor region of the reader apparatus and positioned adjacent a portion of the reference surface. In this embodiment, the two or more optical sensors are configured to detect passage of one or more of the reference features through respective detection regions of the optical sensors as the reader apparatus is moved relative to the reference surface. The reference features on the reference surface can be substantially identical to one another and can comprise, for example, apertures in the reference surface or regions on the reference surface having a substantially different contrast than adjacent regions on the reference surface. In some implementations, the device further includes a laser-detection system housed within the reader apparatus and configured to detect a reference laser beam incident on the reader apparatus at a fixed location of the reader apparatus. The device can further include a processing unit located in the reader apparatus and electrically coupled to the two or more optical sensors. The processing unit can be configured, for example, to determine an extent and direction of motion of the reader apparatus relative to the reference surface based at least in part on the signals received from the two or more optical sensors.

According to an exemplary method disclosed herein, the passage of one or more reference indicators on a grade-rod reference surface through one or more detection regions positioned proximate to the grade-rod reference surface is detected. Information associated with the movement of the detection regions relative to the grade-rod reference surface is computed based at least in part on the one or more reference indicators detected. The information can then be reported. The act of computing can comprise, for example, determining an extent and direction of the movement relative to a base value (received, for instance, from a user-operated input device, such as a keypad). Moreover, the act of reporting can comprise displaying the extent of the movement relative to the base value according to a user-selected unit of measure. Further, in certain instances, the passage of the one or more reference indicators is detected in a first detection region associated with a first sensor and in a second detection region associated with a second sensor and offset from the first detection region. The direction of the movement can then be determined based at least in part on whether the passage of the one or more reference indicators through the first detection region precedes the passage of the one or more reference indicators through the second detection region. The act of computing can also comprise, for example, converting a value associated with the movement into a user-selected unit of measure. In certain implementations, the act of detecting comprises detecting electromagnetic coupling differences in the one or more detection regions. In other implementations, the act of detecting comprises detecting optical differences in the one or more detection regions. Systems and apparatus for performing the exemplary methods are also disclosed herein.

The foregoing and other objects, features, and advantages of the invention will become more apparent from the following detailed description, which proceeds with reference to the accompanying figures.

BRIEF DESCRIPTION OF THE DRAWINGS

FIG. 20 is a schematic front view of two exemplary electromagnetic sensors configured to directly contact a corresponding reference surface as can be used in embodiments of the grade-rod technology.

FIG. 21 is a schematic side view of the electromagnetic sensors shown in FIG. 20.

DETAILED DESCRIPTION

Disclosed below are representative embodiments of grade rods, grade-rod readers, and combinations thereof that should not be construed as limiting in any way. Instead, the present disclosure is directed toward all novel and nonobvious features and aspects of the various disclosed embodiments, alone and in various combinations and subcombinations with one another. The disclosed technology is not limited to any specific aspect or feature, or combination thereof, nor do the disclosed embodiments require that any one or more specific advantages be present or problems be solved. Certain embodiments of the disclosed technology, for example, concern grade rods, grade-rod readers, and combinations thereof that can measure, compute, and/or report elevation differences automatically.

Figure 1:
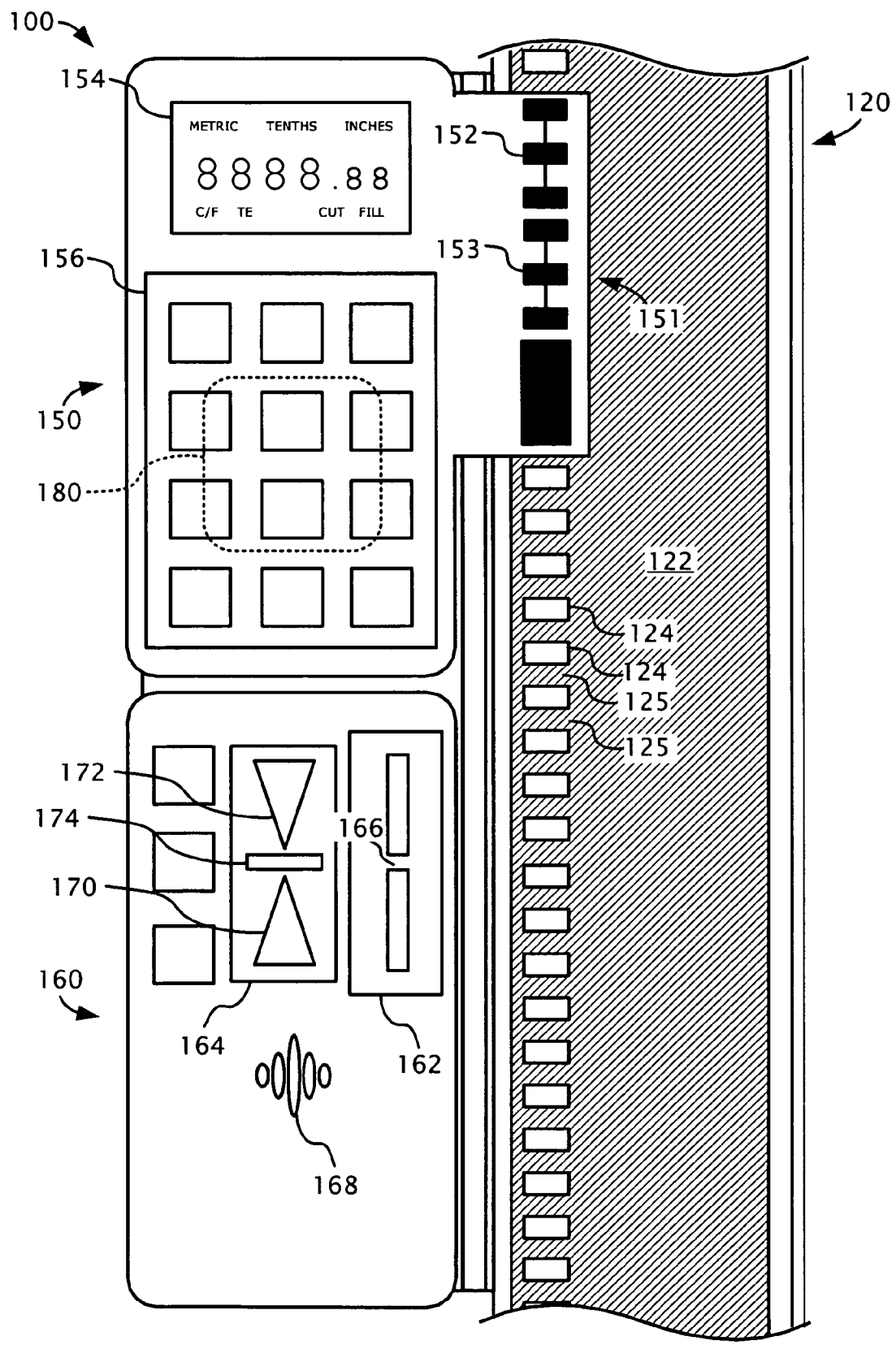
FIG. 1 is a schematic front view of a first exemplary grade-rod reader, laser-detecting unit, and grade rod according to the disclosed technology.

An exemplary embodiment of a grade rod and grade-rod reader according to the disclosed technology is illustrated in FIG. 1. FIG. 1 is a schematic front view of a surveying system 100 comprising a grade rod 120 (only partially shown in FIG. 1) and grade-rod reader 150 slidably coupled to the grade rod 120. For example, the illustrated grade-rod reader 150 (or any other grade-rod reader embodiment disclosed herein) can be configured to engage the grade rod 120 slidably at one side of the grade-rod reader 150 so that the grade-rod reader 150 can be moved up and down the side of the grade rod 120. For instance, the adjacent sides of the grade-rod reader 150 and the grade rod 120 can form a tongue-and-groove configuration joining the grade-rod reader 150 to the grade rod 120. A variety of other mechanisms for engaging the grade-rod reader 150 to the grade rod 120 can alternatively be used. For example, the grade-rod reader 150 can define an aperture through which the grade rod 120 can be inserted. One or more adjustable fasteners (not shown) can also be included on the grade-rod reader 150 and configured to maintain the grade-rod reader 150 frictionally in a fixed position on the grade rod 120 whenever the fasteners are engaged with the grade rod.

The grade rod 120 typically comprises an elongated rod or staff having a first end (a base end) and a second opposite end (a top end). The grade rod 120 can have any of a variety of different cross-sections, such as square, rectangular, elliptical, partially elliptical, circular, or partially circular. Further, the grade rod 120 can be manufactured from any of various suitably rigid materials, such as metal (for example, aluminum, steel, or other appropriate metal or alloy) or hard plastic. In the illustrated embodiment, the grade rod 120 additionally comprises a surface 122 on which a plurality of reference indicators 124 are disposed. For this reason, the surface 122 is sometimes referred to as the "reference surface." The reference surface 122 can be a surface integrally attached to the grade rod 120 or a surface on tape or the like associated with (for example, adhered to) the grade rod. As more fully explained below, the reference indicators 124 can comprise any of various different types of indicators that are readable (or detectable) by one or more sensors located in a sensor region 151 of the grade-rod reader 150 (for example, electromagnetic sensors 152, 153). In any of the embodiments disclosed herein, at least some of the reference indicators 124 can be substantially identical to one another and spaced at substantially even intervals along the reference surface 122. For example, the reference indicators 124 can be formed so that the sensors 152, 153 cannot distinguish one individual indicator from another. By detecting the reference indicators 124 as they pass through a detection region of the sensors 152, 153, the sensors 152, 153 can produce data that are processed in the grade-rod reader 150 to determine the motion of the reader 150 relative to the reference surface 122. Further, because the reference indicators 124 are physically associated with the grade rod 120, the surveying system is highly reliable and durable.

In the embodiment illustrated in FIG. 1, and as more fully discussed below, the reference indicators 124 comprise conductive regions disposed at substantially even intervals of the reference surface 122 between relatively nonconductive regions 125. The conductive regions can be connected to one another by a common conductive substrate beneath the reference surface 122. Each of the sensors 152, 153 on the exemplary grade-rod reader 150 shown in FIG. 1 correspondingly comprises one or more electromagnetic sensors configured to detect the formation and termination of electromagnetic couplings (such as a capacitive, inductive, or magnetic couplings) between the sensors 152, 153 and the reference indicators 124 as the grade-rod reader 150 is moved along the grade rod 120 and over respective reference indicators 124.

The exemplary grade-rod reader 150 (typically implemented in a plastic housing) also includes a processing unit 180 configured to receive and analyze data produced by the sensors 152, 153. The processing unit 180 can be configured to analyze the data from the sensors 152 and to determine, for example, the extent of motion of the grade-rod reader 150 from a first point to another point (for example, relative to a known value at the first point and according to a fixed or variable unit of measure) and the direction of such motion. Thus, the processing unit 180 can compute and report a new elevation value of the reader 150 relative to a reference value. The processing unit 180 can be implemented using a variety of different hardware architectures. For example, in one exemplary embodiment, the processing unit 180 comprises a microcontroller programmed with specialized microcontroller instructions. In other embodiments, the processing unit 180 is implemented using any of various other types of microprocessors, application specific integrated circuits (ASICs), programmable logic devices (such as field programmable gate arrays (FPGAs)), systems-on-a-chip (SOCs), or combinations thereof.

The illustrated grade-rod reader 150 of FIG. 1 further comprises a keypad 156, for inputting user data or selecting an operational mode, and a display 154 for reporting data. For example, the display 154 can report results of computations performed by the processing unit 180. According to one exemplary embodiment, the keypad 156, processing unit 180, and display 154 are configured to allow a user to select a measurement unit (for example, imperial units (feet, inches, and so on), metric units (meters, centimeters, and so on), or other standardized unit), a measurement offset (for example, a reference grade from an earlier measurement or elevation), and/or a measurement type (for example, true elevation, cut/fill, or other such measurement type). The display can be any type of suitable display, such as LED, LCD, or other type of display technology. For illustrative purposes only, the display 154 in FIG. 1 (as well as the displays of the other illustrated embodiments) shows an exemplary range of values (four integer digits and two fractional digits) as well as information associated with the operational mode and selected unit of measure.

In the embodiment illustrated in FIG. 1, the grade-rod reader 150 is further coupled to a laser-detecting portion 160. The laser-detecting portion 160 of FIG. 1 comprises a laser detector 162 configured to detect an incident plane of laser light at any point along the vertical detection surface of the laser-detecting portion 160. The laser detector 162 shown in FIG. 1 is further configured to operate in connection with an alignment display 164 that indicates whether the incident plane of laser light is above, below, or on grade with a reference point on the laser detector 162 (shown at point 166). For example, in the illustrated embodiment, the alignment display 164 can display an "up" arrow 170 if the incident light is above the reference point 166 (indicating that the laser-detecting portion 160 and the grade-rod reader 150 need to be moved upward along the grade rod 120 to be on grade), a "down" arrow 172 if the incident laser light is below the reference point (indicating that the laser-detecting portion 160 and the grade-rod reader 150 need to be moved downward to be on grade), or a horizontal bar 174 if the incident plane of light is at the reference point. A speaker 168 or other audio transducer can be configured to emit an audible signal when the laser-detecting portion 160 is on grade.

Figure 2:
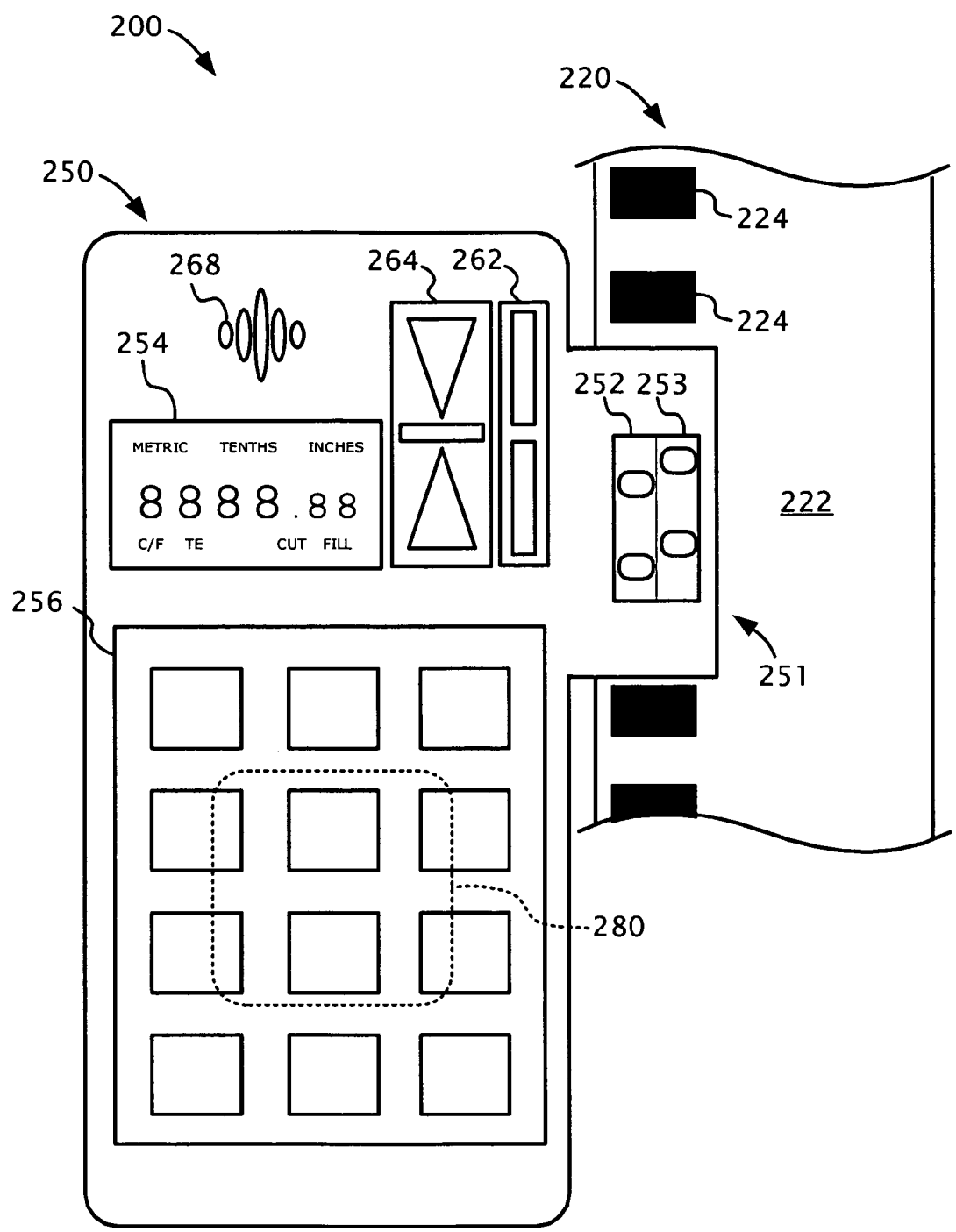
FIG. 2 is a schematic front view of a second exemplary grade-rod reader and grade rod according to the disclosed technology.
Figure 3:
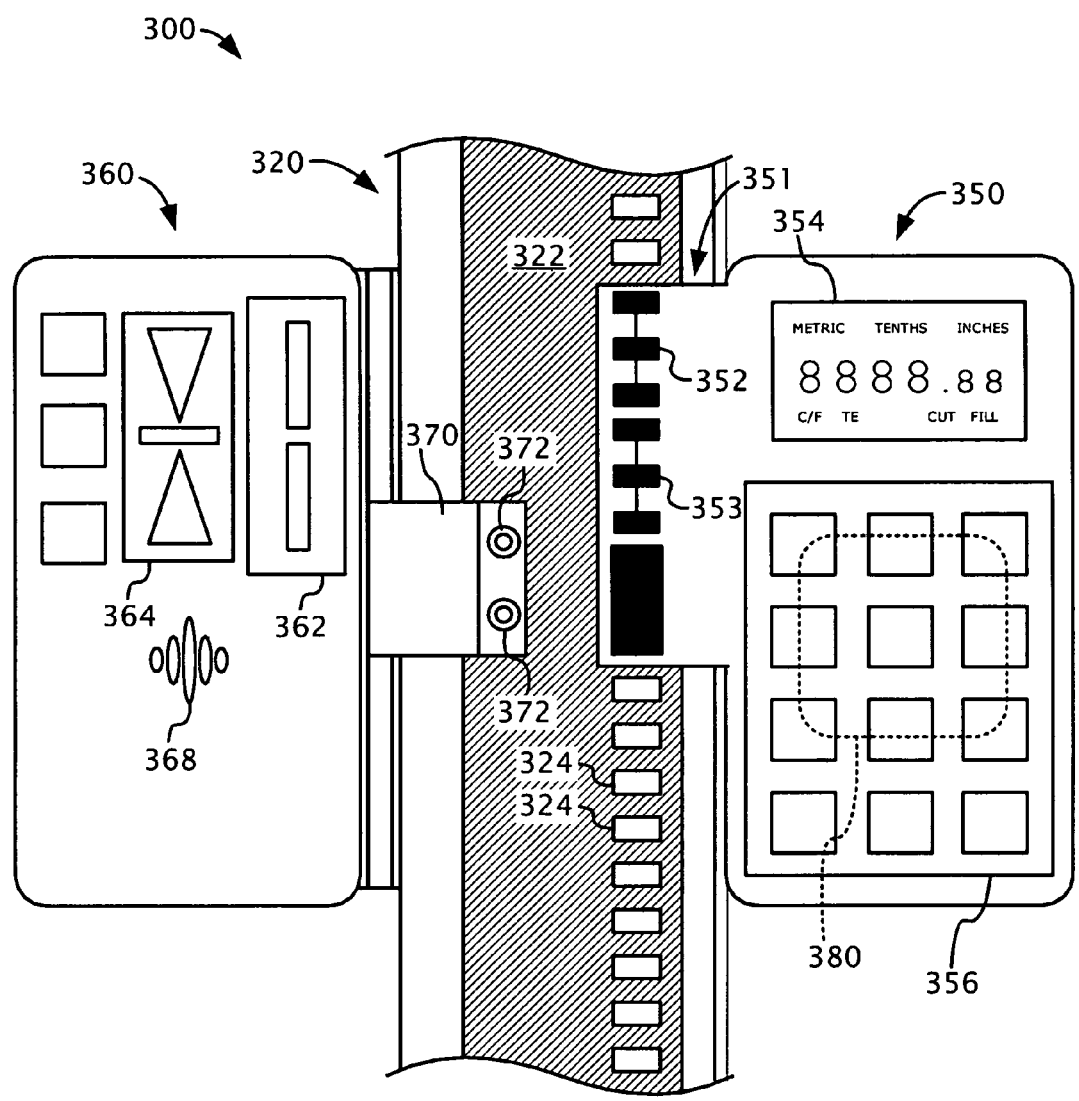
FIG. 3 is a schematic front view of a third exemplary grade-rod reader, laser-detecting unit, and grade rod according to the disclosed technology.

Although the laser-detecting portion 160 is coupled to the grade-rod reader 150 in FIG. 1, any of the components of the laser-detecting portion can be further integrated within the grade-rod reader 150 or included in a separate unit. FIGS. 2 and 3, for example, show two such alternative embodiments of the surveying system. In the system 200 shown in FIG. 2, a grade-rod reader 250 is slidably coupled to a grade rod 220 having a reference surface 222 of two or more substantially evenly disposed reference indicators 224. The grade-rod reader 250 of this embodiment incorporates a laser detector 262, alignment display 264, and speaker 268 into a single compact housing. The grade-rod reader 250 further includes a processing unit 280, display 254, and keypad 256 as described above with respect to FIG. 1. The grade-rod reader 250 of FIG. 2 further comprises sensors in a sensor region 251. In this exemplary embodiment, the sensors comprise optical sensors—specifically, a first pair 252 and a second pair 253 of optical sensors that are offset slightly in the direction of the grade-rod reader's 250 path along the grade rod 220. Correspondingly, the reference indicators 224 of FIG. 2 comprise respective optical indicators that are detectable by the sensors 252, 253. For instance, in certain embodiments, the reference indicators 224 (or reference features) comprise darkened regions (or regions of substantially different contrast) on the reference surface 222. In some embodiments, at least some of the reference indicators 224 are substantially identical to one another. For example, the reference indicators 224 can be formed so that the sensors 252, 253 cannot distinguish one individual indicator from another.

In the system 300 shown in FIG. 3, a grade-rod reader 350 and a laser-detecting unit 360 comprise separate housings. In the illustrated embodiment, the laser-detecting unit 360 is coupled to a reference surface 322 via bracket 370 and fasteners 372 (for example, one or more threaded fasteners, such as screws or bolts, or one or more grommets) and is further configured to slide along the grade rod 320. The laser-detecting unit 360 of the illustrated embodiment further comprises a laser detector 362, alignment indicator 364, and speaker 368 as described above with respect to FIG. 1. The grade-rod reader 350 of FIG. 3 can be set in a fixed position of the grade rod 320 (for example, via a bracket coupled to the grade rod 320 or to a rear-rod portion of the grade rod 320 if the grade rod is a telescoping grade rod as described below). The grade-rod reader 350 of the illustrated embodiment further comprises a sensor region 351 and a processing unit 380 as described above with respect to FIG. 1.

As more fully explained below with respect to FIG. 4A, a reference surface 322 comprising a plurality of evenly displaced reference indicators 324 can be located on the grade rod 320 and movable relative to the sensor region 351 of the grade-rod reader 350. For instance, the reference surface 322 can comprise an outward-facing surface of tape extending between two portions of the grade rod 320 (which can be a telescoping grade rod). The grade-rod reader 350 of the illustrated embodiment further includes sensors 352, 353 in the sensor region 351 (in the illustrated embodiment, electromagnetic sensors), a keypad 356, and a display 354.

In certain embodiments, a telescoping grade rod can be used in order to obtain an extended operating height. A cross-sectional top view of an exemplary telescoping grade-rod assembly 400 using the grade-rod reader 350 and the laser-detecting unit 360 of FIG. 3 is illustrated in FIG. 4A. In FIG. 4A, the grade rod 420 comprises a rear-rod section 432 and a front-rod section 430 that is vertically movable relative to the rear-rod section 432. For example, in the illustrated embodiment, the front- and rear-rod sections 430, 432 are slidably engaged to one another by tongue-and-groove configurations 434, 436 at respective corners of the front- and rear-rod sections 430, 432. The tongue-and-groove configurations 434, 436 allow the front-rod section 430 to be telescopically elevated above an upper end of the rear-rod section 432. In the illustrated embodiment, tape 421 extends along a front surface 426 and a rear surface 428 of the front-rod section 430. As explained above, the tape 421 further defines a reference surface 422 on which a plurality of reference indicators 424 are disposed. The tape 421 can extend, for example, between an upper region of the front-rod section 430 and a lower region of the front-rod section 430.

Figure 4A:
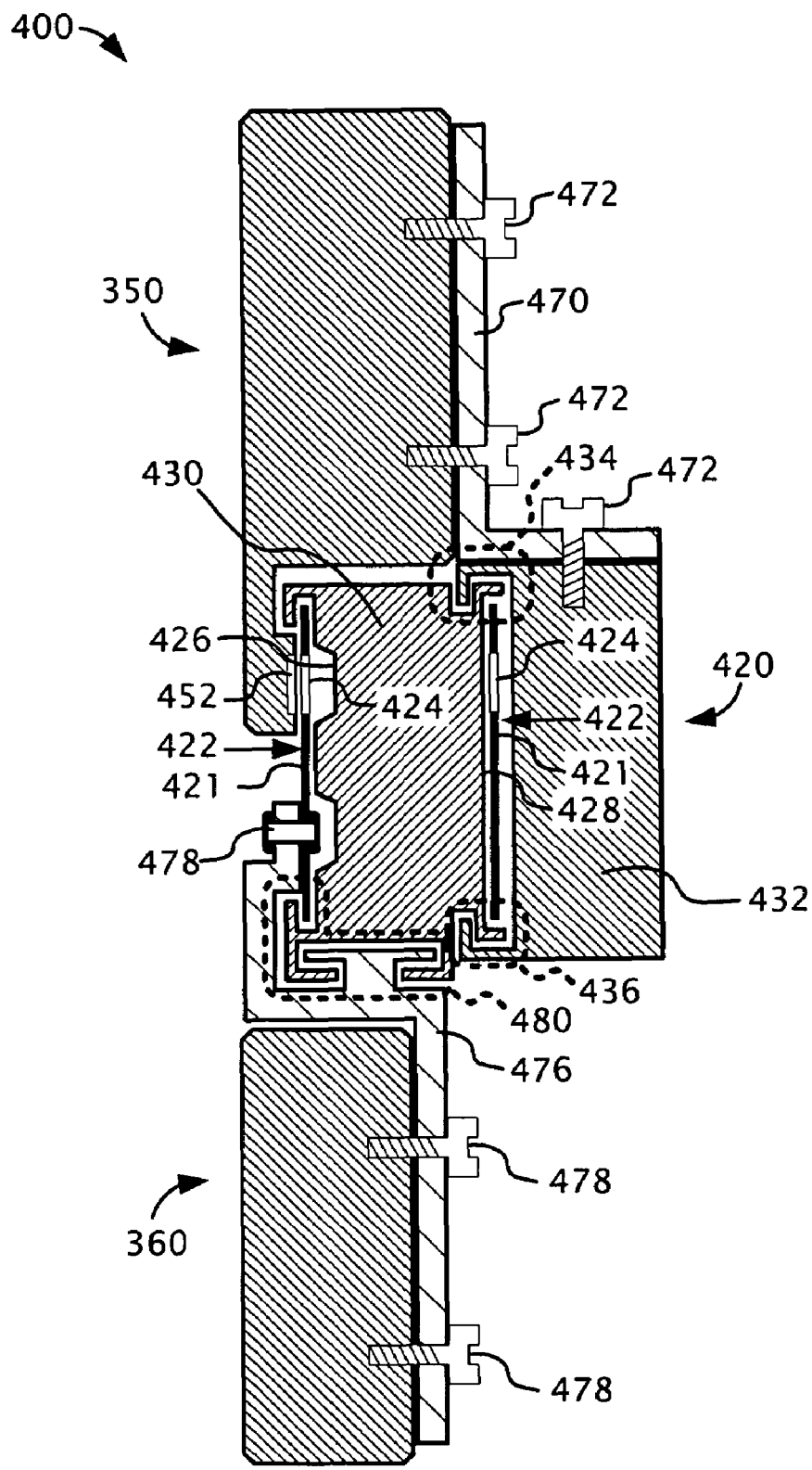
FIG. 4A is a schematic cross-sectional view of a telescoping grade rod using the grade-rod reader and laser-detecting unit of FIG. 3.
Figure 4B:
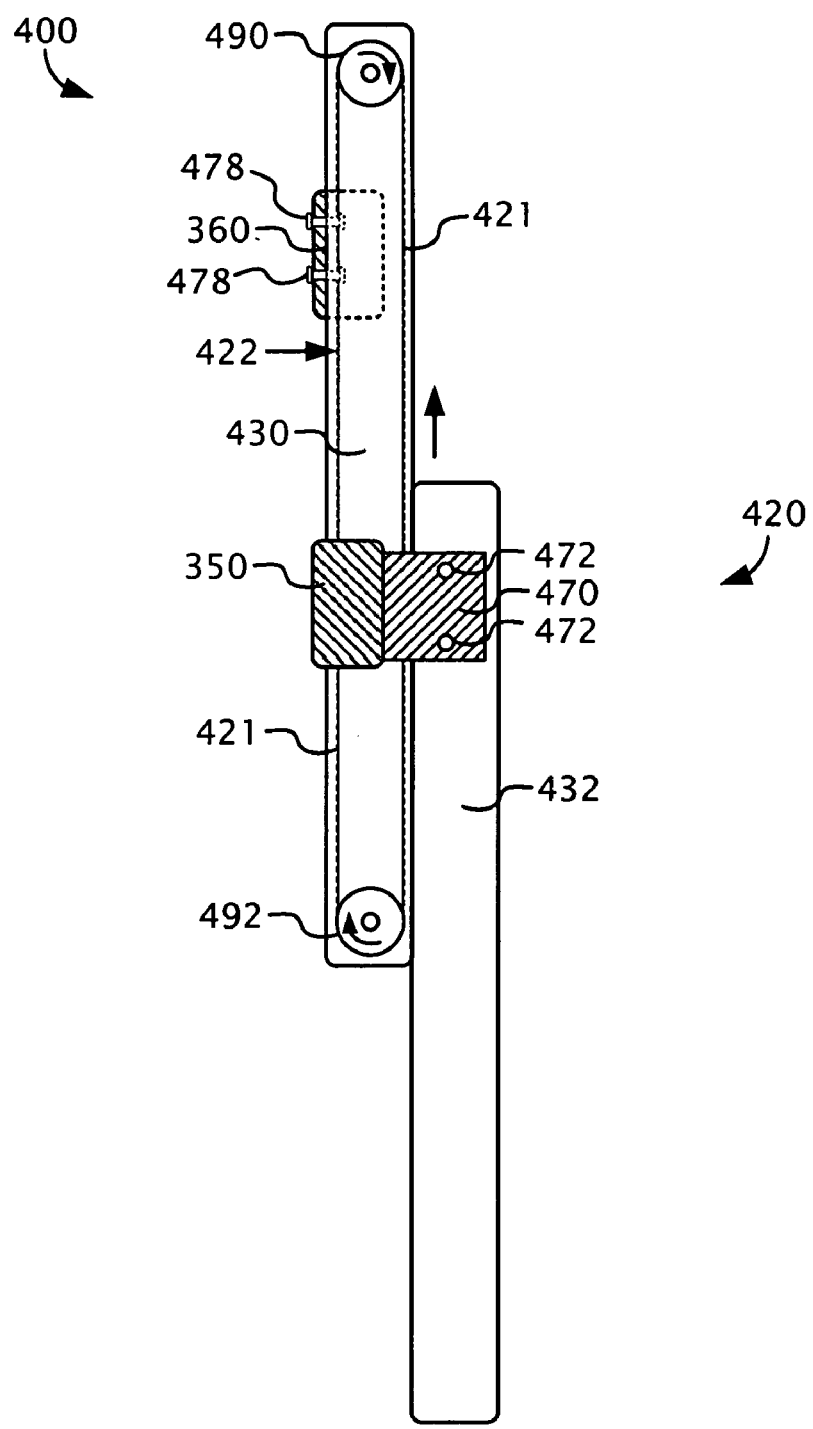
FIG. 4B is a schematic elevation view of a first exemplary embodiment of the telescoping grade rod illustrated in FIG. 4A.

FIG. 4B illustrates an embodiment of the grade-rod assembly 400 in which the tape 421 extends between two rollers 490, 492. For instance, a first roller 490 can be located at or near a top end of the front-rod section 430, and a second roller 492 can be located at or near a bottom end of the front-rod section 432. In the illustrated embodiment, the tape 421 forms a single loop of tape disposed between the first roller 490 and the second roller 492.

In FIGS. 4A and 4B, the grade-rod reader 350 is affixed to the rear-rod section 432. For example, the grade-rod reader 350 can be attached by a bracket 470 using one or more fasteners 472. The grade-rod reader 350 can be adjustably positioned, for instance, at a fixed point on the grade rod 420. The laser-detecting unit 360 of the illustrated embodiment is affixed to reference surface 422 of the tape 421. For example, a bracket 476 having one or more fasteners 478 (for example, one or more grommets) can be used to affix the laser-detecting unit 360 to the reference surface 422. In the illustrated embodiment, the bracket 476 slidably engages a side of the front-rod section 430 via a tongue-and-groove configuration 480. Thus, by sliding the laser-detecting unit 360 and/or the front-rod section 430, the elevational range of the grade rod 420 can be extended. Further, by connecting the tape 421 to the laser-detecting unit 360, the reference surface 422 of the tape 421 can be moved relative to the grade-rod reader 350 as the grade rod is extended or as the laser-detecting unit 360 is repositioned. The grade-rod reader 350 can thus measure the motion of the laser-detecting unit 360 as the front-rod section 430 is being telescopically extended or as the laser-detecting unit 360 is being moved along the front-rod section 430 while pulling the tape 421 with it.

Figure 4C:
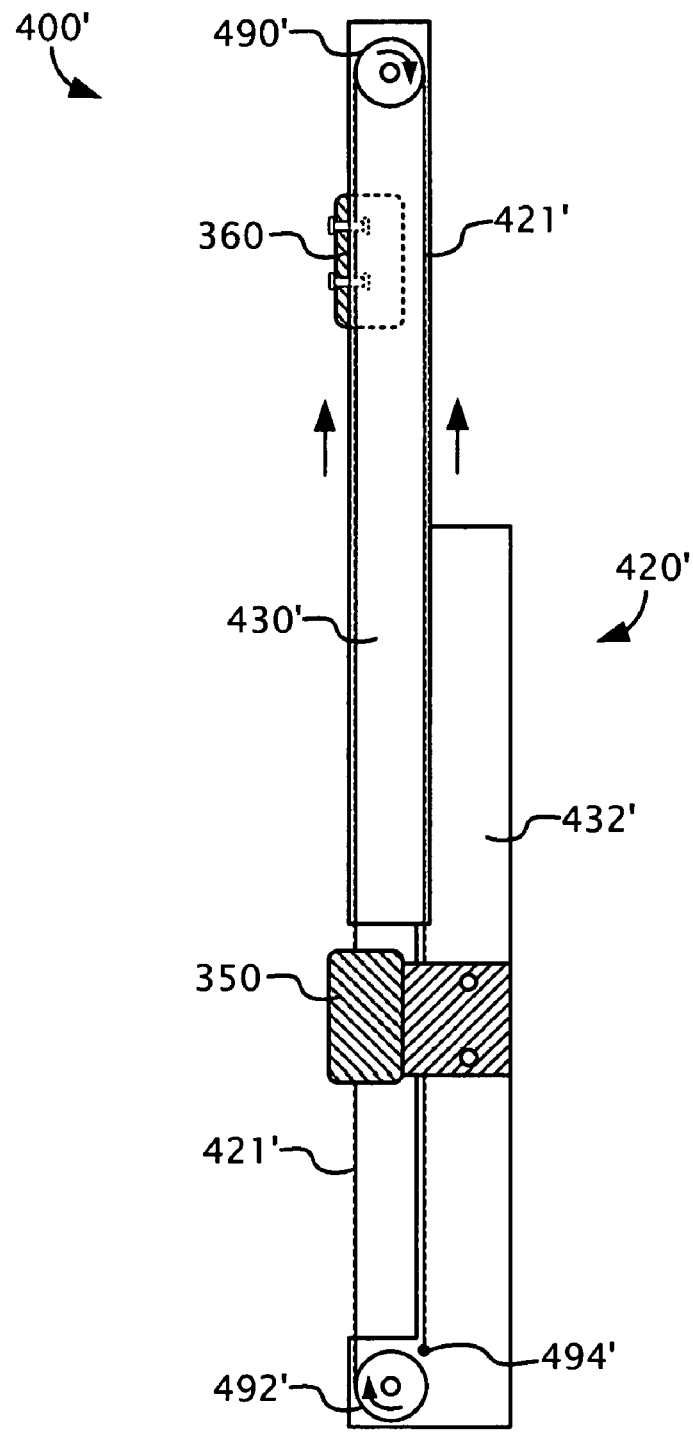
FIG. 4C is a schematic elevation view of a second exemplary embodiment of the telescoping grade rod illustrated in FIG. 4A.

FIG. 4C illustrates an alternative embodiment 400' of the grade-rod assembly wherein tape 421' extends between two rollers 490', 492'. In this embodiment a first roller 490' is located at or near a top end of front-rod section 430', and a second roller 492' is located at or near a bottom end of rear-rod section 432'. One end 494' of the tape 421' can be secured in a fixed position of the rear-rod section 432' while the other end of the tape can be attached to the second roller 492'. The second roller 492' is a spring-loaded roller that operates to spool unused portions of the tape whenever the grade rod 420' is not fully extended. The spring-loaded roller 492' also provides tension to the tape 421' while the grade rod is in its various states of extension.

In other embodiments, the tape can extend only across a front surface of the front-end section. In this embodiment, one end of the tape can be attached at or near the top end of the front-rod section and the other end of the tape can be attached to a single spring-loaded roller (for example, located at or near a bottom end of the rear-rod section).

In certain embodiments of the disclosed technology, the grade-rod reader is configured to determine and report its movement relative to the reference surface in multiple units of measure. For example, in one particular embodiment, the grade-rod reader can compute and report movement in imperial units, metric units, or other standardized unit. The unit of measure is typically selected by a user during grade-rod reader operation and can be changed at any time. In some implementations, a single track of reference indicators is used on the reference surface of the grade rod, wherein each indicator is separated from adjacent indicators by substantially the same distance. In such implementations, conversion to the desired unit of measure is performed by a processing unit contained within the grade-rod reader. Examples of such embodiments are shown in FIGS. 1, 2, and 3. Alternatively, multiple tracks of reference indicators on the reference surface can be used, wherein each track corresponds to a different unit of measure. An example of such a grade-rod reader and grade-rod combination is shown in FIG. 5.

Figure 5:
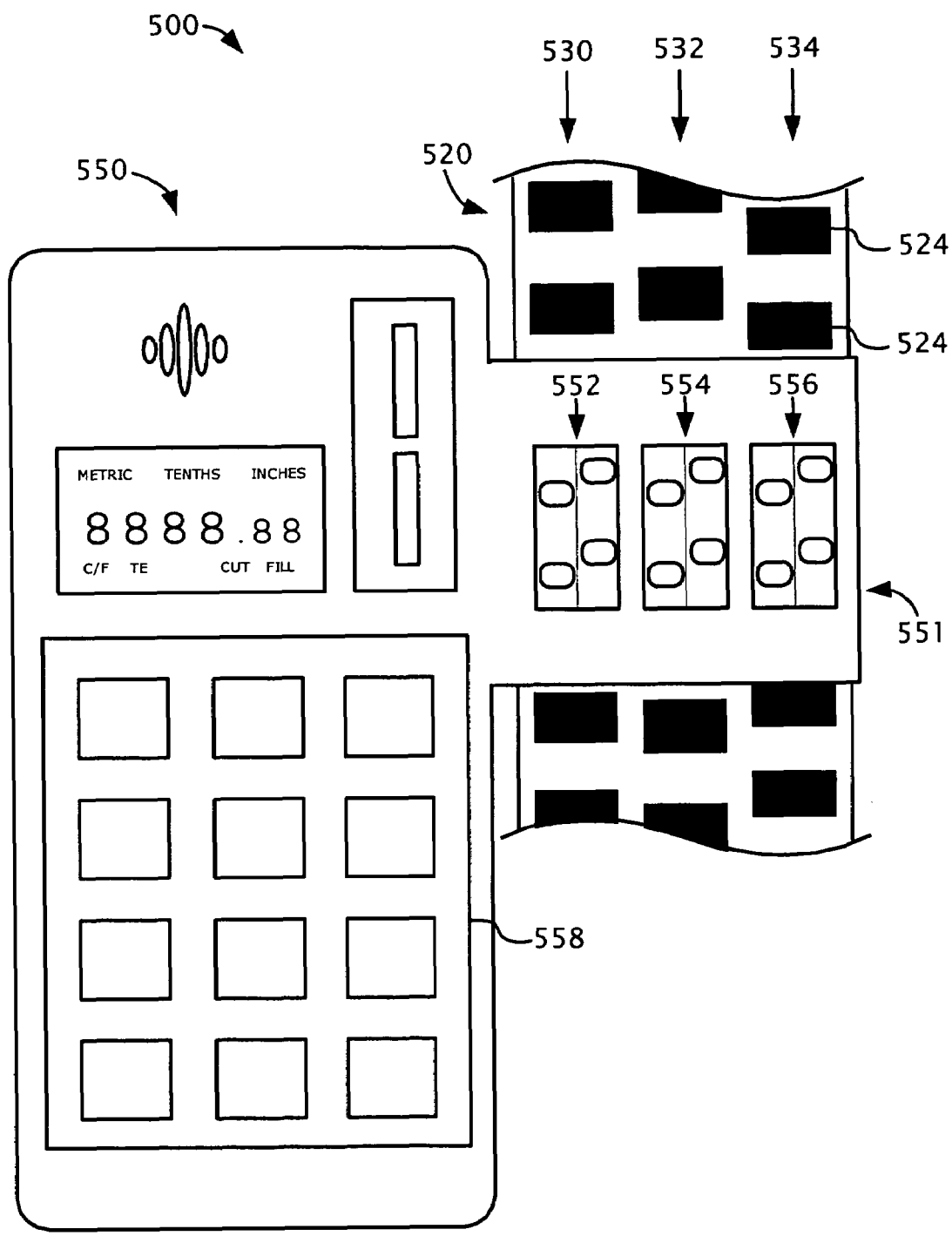
FIG. 5 is a schematic front of a fourth exemplary grade-rod reader and grade rod according to the disclosed technology.

FIG. 5 shows a surveying system 500 comprising a grade rod 520 that includes three tracks 530, 532, 534 of reference indicators 524. Each respective track 530, 532, 534 is scaled to a different metric or imperial unit. Also shown in FIG. 5 is a grade-rod reader 550 comprising a sensor region 551 that has three sensor pairs 552, 554, 556 configured to detect movement along the respective tracks 530, 532, 534. In the illustrated embodiment, for instance, the sensor pairs 552, 554, 556 comprise respective optical sensors. Therefore, depending on the desired unit of measure (selected, for example, by the user via a keypad 558), movement of the reader 550 can be measured, computed, and reported using at least one of tracks 530, 532, 534 and associated sensors 552, 554, 556.

Figure 6:
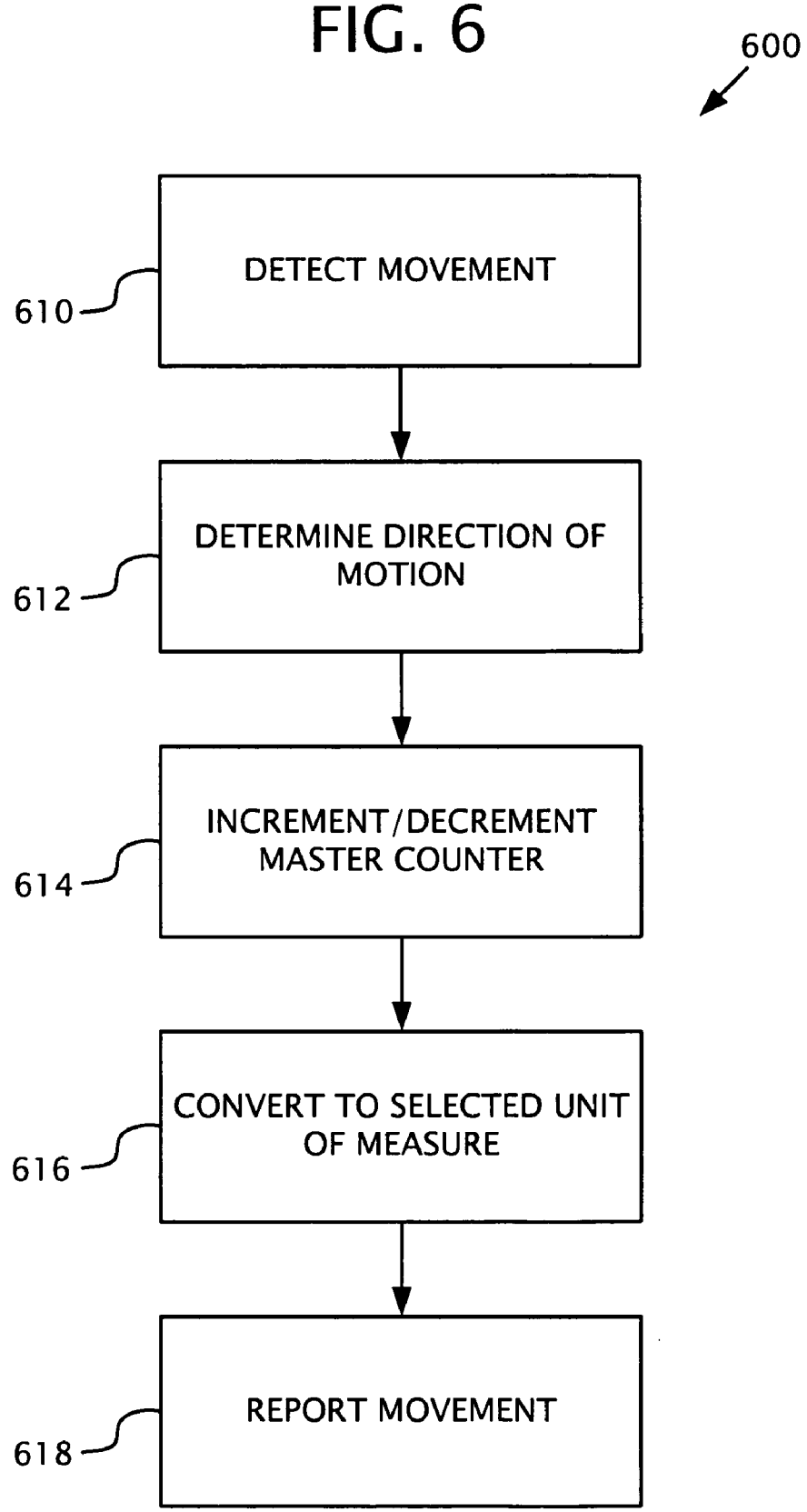
FIG. 6 is a flowchart of an exemplary overall method of operating an embodiment of the disclosed technology.

FIG. 6 is a flowchart illustrating an exemplary overall method 600 for operating an embodiment of the disclosed surveying system. The method 600 can be performed, for example, by a processing unit in a grade-rod reader of the disclosed technology (for example, a microprocessor-based unit). At process block 610, movement of the grade-rod reader is detected by one or more sensors. In embodiments where multiple tracks of reference indicators are disposed on the grade rod and readable by the grade-rod reader, the output from the sensors on the desired track (corresponding to the desired unit of measure) can be selected (for example, via a multiplexing function) and detected. In certain desirable embodiments, the sensors for a respective track of reference indicators comprise at least a pair of sensors that are offset relative to one another. A discussion of how sensors can be offset and used to detect direction is provided below with respect to FIGS. 7 through 9.

Figure 9:
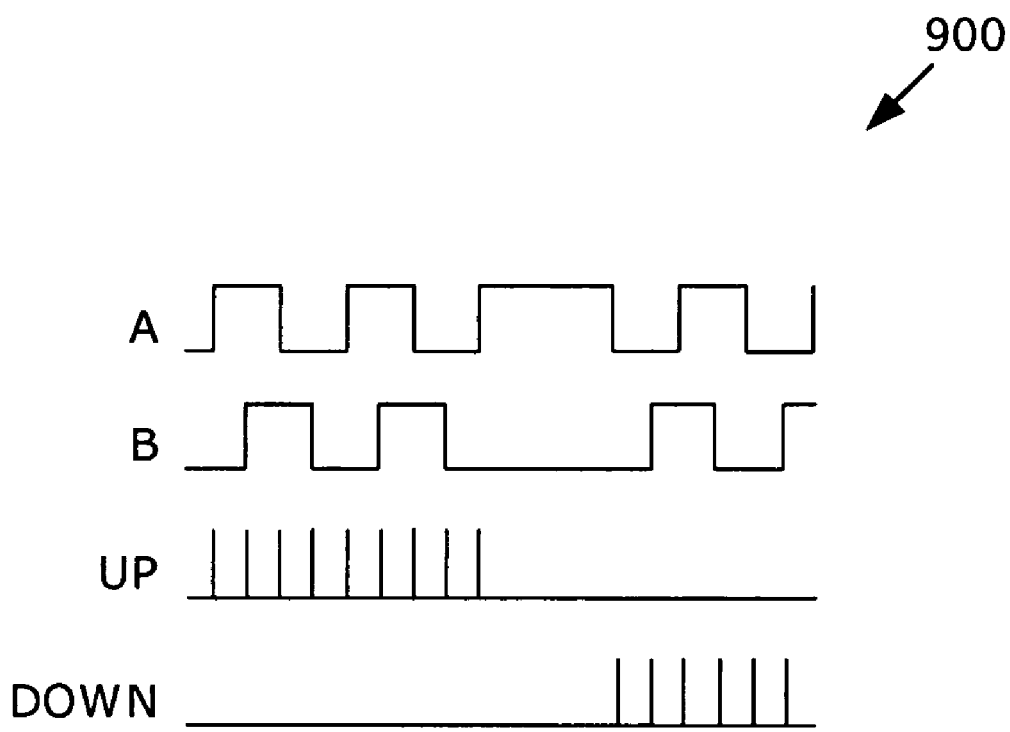
FIG. 9 is a schematic timing diagram illustrating how signals produced by offset sensors can be used to determine a direction of grade-rod reader motion.

At process block 612, the direction of movement of the grade-rod reader is determined. For example, in embodiments using offset sensors, the sequence in which the sensors detect the reference indicators can be used to determine the direction of travel. An exemplary timing diagram illustrating how the sequence of detecting reference indicators between two offset sensors can be used to determine the direction of motion is shown in FIG. 9 and discussed more fully below.

At process block 614, a master counter or the like is incremented or decremented based at least partially on the movement detected at process block 610 and the direction of motion determined at process block 612. The flowchart in FIG. 10, discussed below, shows an exemplary procedure for incrementing the master counter using information from process blocks 610, 612. The base value of the master counter can be user selectable or based on an internally stored or determined value. For example, when the grade-rod reader is operating in a true elevation mode, the base value can comprise the previous elevation of the grade-rod reader (for example, computed internally using an altimeter or input from a user).

At process block 616, the value of the master counter is converted into a desired unit of measure. The unit of measure can be a user-selected unit of measure (input, for example, via a keypad on the grade-rod reader), such as an imperial or metric unit.

At process block 618, the converted value of the master counter, which is indicative of the movement of the reader, is reported. For instance, the value can be output to a user via a display on the grade-rod reader.

Figure 7:
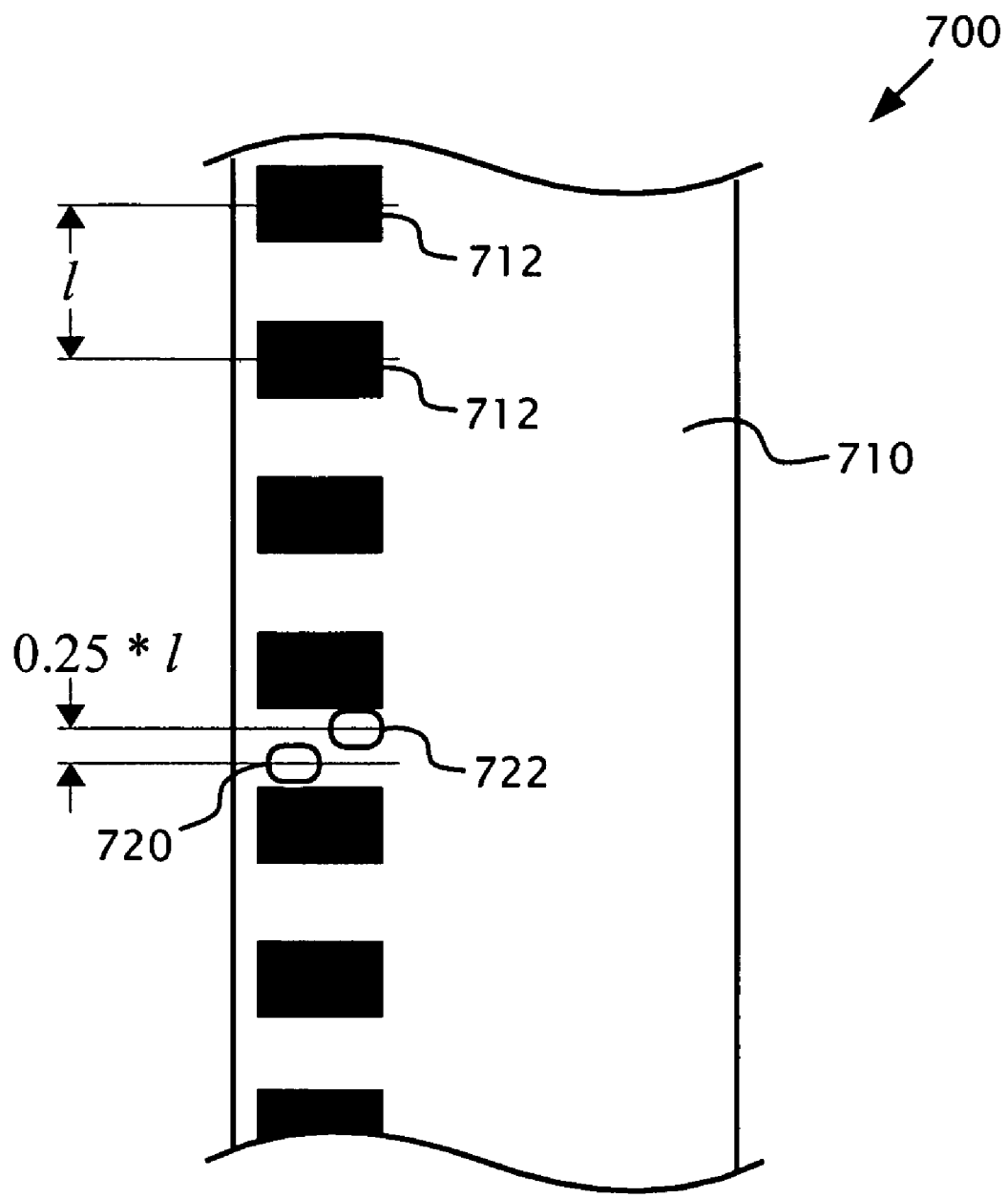
FIG. 7 is a schematic diagram illustrating a first exemplary manner of offsetting sensors of a grade-rod reader as may be used in embodiments of the disclosed technology.
Figure 8:
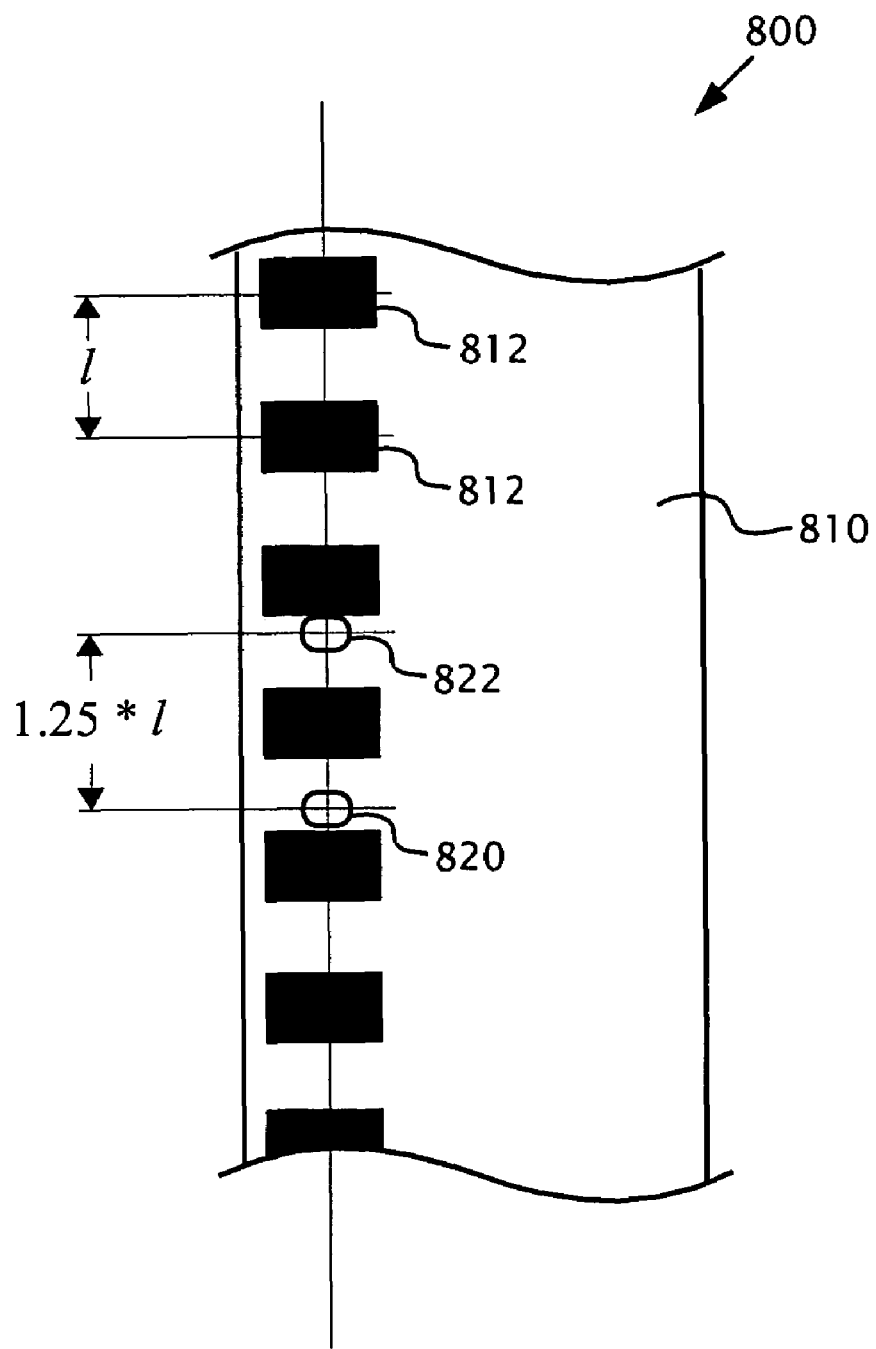
FIG. 8 is a schematic diagram illustrating a second exemplary manner of offsetting sensors of a grade-rod reader as may be used in embodiments of the disclosed technology.

As noted above, two or more sensors in the sensor region of the grade-rod reader can be offset relative to one another. The sensors can be offset, for example, by a fixed amount sufficient to indicate the direction of grade-rod reader travel. For instance, in some embodiments, a first set of one or more sensors is offset from a second set of one or more sensors along the path of grade-rod reader travel by approximately a quarter of the distance between adjacent reference indicators. FIG. 7, for instance, illustrates two sensors 720, 722 offset by a quarter of the distance between adjacent reference indicators 712. In particular, FIG. 7 shows an exemplary reference surface 710 on which multiple reference indicators 712 are disposed. In the illustrated embodiment (and in any embodiment described herein), the reference indicators 712 are substantially identical and the distance between adjacent reference indicators 712 is substantially constant. In FIG. 7, for example, the distance between the centers of adjacent reference indicators 712 is distance l. This distance is sometimes referred to as the "repeat distance." FIG. 7 schematically shows the exemplary positions of two sensors 720, 722 of an associated grade-rod reader. As can be seen in FIG. 7, the sensors 720, 722 are offset by one quarter of the repeat distance l (0.25*l). It should be understood that this particular offset is for illustrative purposes only and that the sensors can be offset by other amounts, such as distances less than 0.25*l (for example, between 0.01*l and 0.25*l) or greater than 0.25*l (for example, between 0.25*l and 0.49*l). Further, because the illustrated reference indicators 712 are separated from each other by a fixed distance (the repeat distance), the sensors 720, 722 can also be offset from one another by distances associated with integer multiples of the repeat distance l. For example, valid offsets for the sensors 720, 722 can be determined by the formula (n+0.25)l, where l is the repeat distance and n is any integer. For example, FIG. 8 shows a pair of sensors 820, 822 offset by 1.25 l along the axis of the reading reference indicators 812 on the reference surface 810. This increased offset can help reduce the crowding of sensors on the sensor region of the grade-rod reader. It should be noted that the value 0.25 in the exemplary formula can vary from implementation to implementation (for example, between 0.01 and 0.49). Further, in the embodiments illustrated in FIGS. 7 and 8 (and in any embodiment described herein) the size of the reference indicator and of the space between adjacent reference indicators along the sensors' path of travel is desirably (though not necessarily) larger than the offset between the sensors. This helps ensure proper detection of the direction of motion of the sensors.

In some implementations, additional sensors can be used. For instance, additional offset pairs of sensors can be included in the sensor region of the associated grade-rod reader (for example, one or more additional offset sensor pairs separated from the other sensor pairs by an integer multiple of the repeat distance). Further, sensors having multiple detection regions for detecting the reference indicators can be used. An example of such a sensor arrangement is shown in FIG. 2, wherein each optical sensor 252, 253 has two apertures (represented by respective ovals in the sensors 252, 253) spaced at the repeat length of the reference indicators.

FIG. 9 is a timing diagram 900 illustrating an exemplary method for determining a direction of motion of an exemplary grade-rod reader based on signals produced from the offset sensors at the sensor region of the grade-rod reader. For purposes of this example, assume that a sensor pair offset by 0.25 l, as explained above, is used—specifically, the sensor pair 720, 722 illustrated in FIG. 7. Further, assume that whenever a respective one of the sensors 720 or 722 is over a reference indicator 712, it produces a higher voltage, and otherwise produces a lower voltage. Further, assume that during the timeframe illustrated in FIG. 9 (corresponding to the x-axis), the grade-rod reader is moved up, stopped, and then moved down the grade rod. Waveform "A" shows the output of the sensor 722 (the sensor that is offset higher on the grade rod) during this exemplary action, and waveform "B" shows the output of the sensor 720 (the sensor that is offset lower on the grade rod). For purposes of clarity, the sensors are thus sometimes referred to as upwardly offset sensor 722 and downwardly offset sensor 720.

According to one embodiment, a processing unit coupled to the sensors 720, 722 and contained in the grade-rod reader receives the signals from the sensors 720, 722 and determines the direction of movement at each rising or falling edge of the waveforms output from the sensors 720, 722. The direction of movement is illustrated in FIG. 9 by counts (or bars) on the waveform "UP" and on the waveform "DOWN." The bars can correspond to logic values used by the processing unit to record direction. The processing unit can then use this directional information to properly perform the computation of the extent of relative motion of the grade-rod reader along the grade rod.

According to one exemplary procedure, and as illustrated in FIG. 9, if a rising-edge event produced by upwardly offset sensor 722 (waveform A) precedes a rising-edge event produced by downwardly offset sensor 720 (waveform B), then the motion of the grade-rod reader is determined to be upward. Similarly, if a falling-edge event produced by upwardly offset sensor 722 precedes a falling-edge event produced by downwardly offset sensor 722, then motion is also determined to be upward. If, however, downwardly offset sensor 720 produces a rising-edge event before upwardly offset sensor 722 produces a rising edge event, then motion of the grade-rod reader is determined to be downward. Likewise, downward motion is determined if downwardly offset sensor 720 produces a falling edge event before upwardly offset sensor 722 produces a falling edge. In this way, the direction of grade-rod reader motion can be determined using the deliberately offset locations of the sensors (similar to a quadrature relationship).

Figure 10:
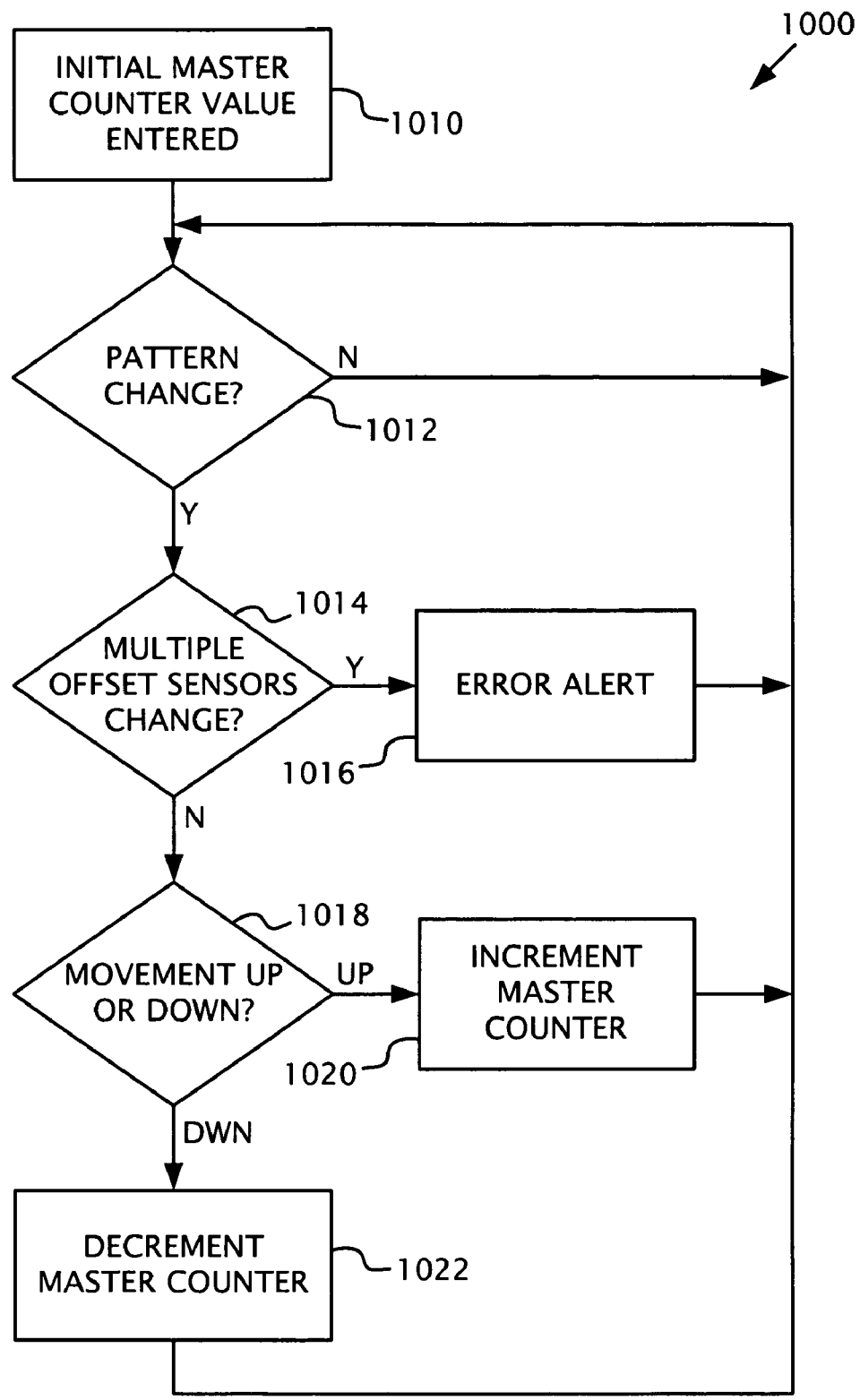
FIG. 10 is a flowchart of an exemplary method for incrementing or decrementing a master counter of a grade-rod reader using information received from sensors of the grade-rod reader.

FIG. 10 is a flowchart 1000 showing an exemplary procedure for incrementing a master counter using the output signals produced by the sensors of an exemplary grade-rod reader (such as any of the grade-rod reader embodiments described herein). The exemplary procedure can be performed, for example, by a processing unit (such as a microprocessor-based circuit) in the grade-rod reader. At process block 1010, an initial master counter value is entered or otherwise determined. The initial master counter value is typically a user-inputted value corresponding to a reference elevation (for example, a true elevation value, a previously determined elevation value, or a value related to the grade-rod reader's distance from a zero point on the grade rod). In some embodiments, the initial value can be computed internally (such as a default value of "0" whenever the grade-rod reader is turned "on" or a value determined from an onboard altimeter) or received from other survey equipment in electrical communication with the grade-rod reader.

At process block 1012, a determination is made as to whether a pattern change has occurred. This determination can be made, for example, by evaluating the output signals from the sensors in the sensor region of the grade-rod reader to determine whether any change in output value has been detected (for example, a rising-edge event or a falling-edge event). If no change is detected, then process block 1012 is performed again at a next sampling period (determined by a sampling frequency). Desirably, the sampling frequency is high enough to allow the grade-rod reader to be moved quickly up and down the grade rod without losing any detection resolution or accuracy. The sampling frequency also depends on the hardware used to implement the processing unit (for example, the frequency of the clock driving the processing unit). If a change is detected, then the procedure proceeds to process block 1014.

At process block 1014, a determination is made as to whether multiple offset sensors have detected a change. For example, in embodiments using two offset sensors, if both sensors detect a change during the same sampling period, then a reader error is regarded as having occurred. An appropriate error alert can be generated at process block 1016. In some embodiments, the error alert reports the error to the user and may require resetting of the grade-rod reader and reentry of the initial master counter value. Or, in some embodiments, the error can be recorded and reported (for example, via an error light on the grade-rod reader), but the procedure 1000 can continue. If no error occurred at process block 1014, then the procedure 1000 proceeds to process block 1018.

At process block 1018, a determination is made as to whether the outputs produced by the sensors are indicative of upward or downward motion. A procedure such as the one described above with respect to FIG. 9 can be used. If upward motion is detected, then the master counter can be incremented at process block 1020, or if downward motion is detected, then the master counter can be decremented at process block 1022. The amount that the master counter is incremented or decremented can depend on the state of the sensor outputs when the direction of motion was detected. For example, because the offset of the sensors is typically fixed, the amount by which the master counter should be incremented or decremented will depend on whether the triggering event at process block 1012 was a rising-edge or falling-edge event and which of the offset sensors experienced the event. In one exemplary embodiment in which the sensor offset is n+0.25 l and the width of each reference indicator is 0.5 l, the amount by which the master counter is incremented or decremented is substantially constant for all rising-edge and falling-edge events (for example, the amount can be 0.25 l). As explained above with respect to FIG. 6, the value of the master counter can then be converted into the desired unit of measure and reported to the user (for example, via a display on the grade-rod reader).

Figure 22:
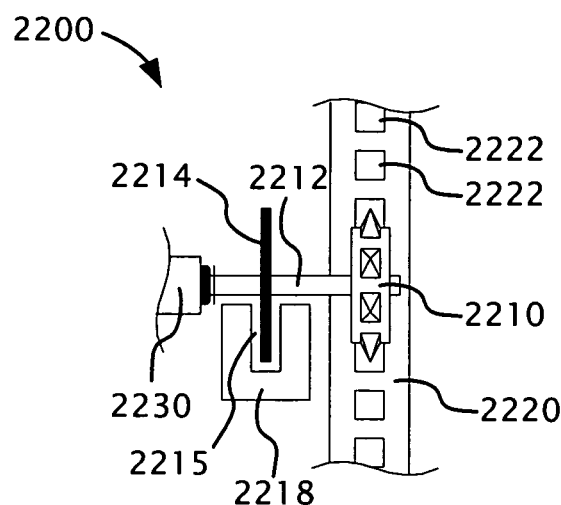
FIG. 22 is a schematic front view of an exemplary mechanical/optical sensor as can be used in embodiments of the disclosed grade-rod technology.
Figure 23:
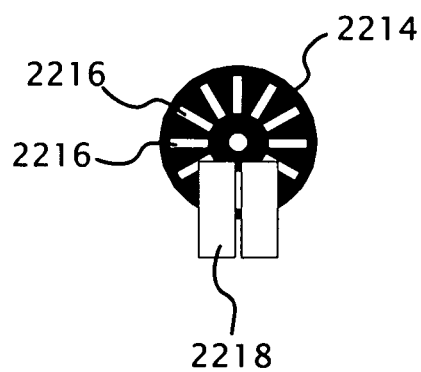
FIG. 23 is a schematic side view of the encoder wheel of the exemplary sensor illustrated in FIG. 22.
Figure 24:
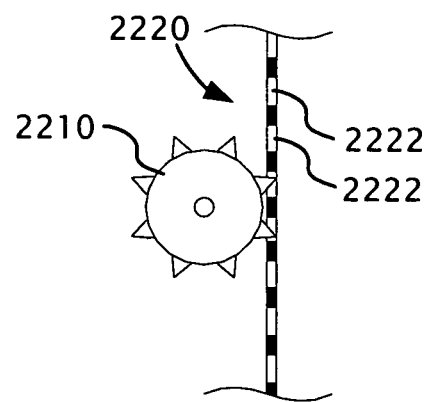
FIG. 24 is a schematic side view of the toothed wheel of the exemplary sensor illustrated in FIG. 22.

As noted above, the sensors that are used in any of the disclosed embodiments can comprise a variety of different sensor types configured to detect or read reference indicators disposed on a reference surface of the grade rod. FIGS. 11 through 14, for example, illustrate exemplary optical sensors, FIGS. 15 through 21 illustrate exemplary electromagnetic sensors, and FIGS. 22 through 24 illustrate an exemplary mechanical/optical sensor. These various exemplary sensors are discussed in more detail in the paragraphs below. Because the reference indicators on the grade-rod reference surface are dependent in part on the type of sensor used, exemplary reference indicators as may be used are also described.

Figure 11:
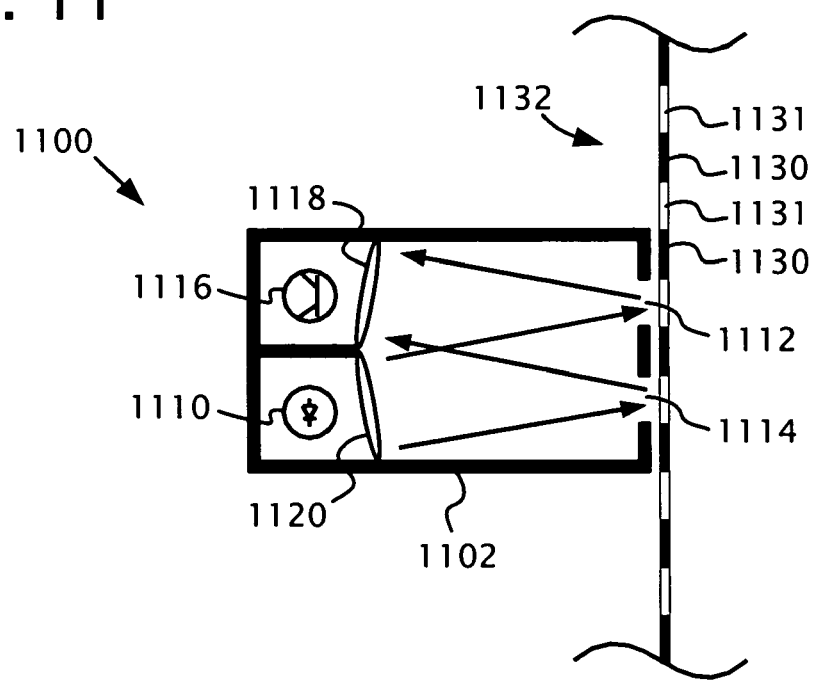
FIG. 11 is a schematic side view of a first exemplary reflective optical sensor as can be used in embodiments of the disclosed grade-rod technology.
Figure 12:
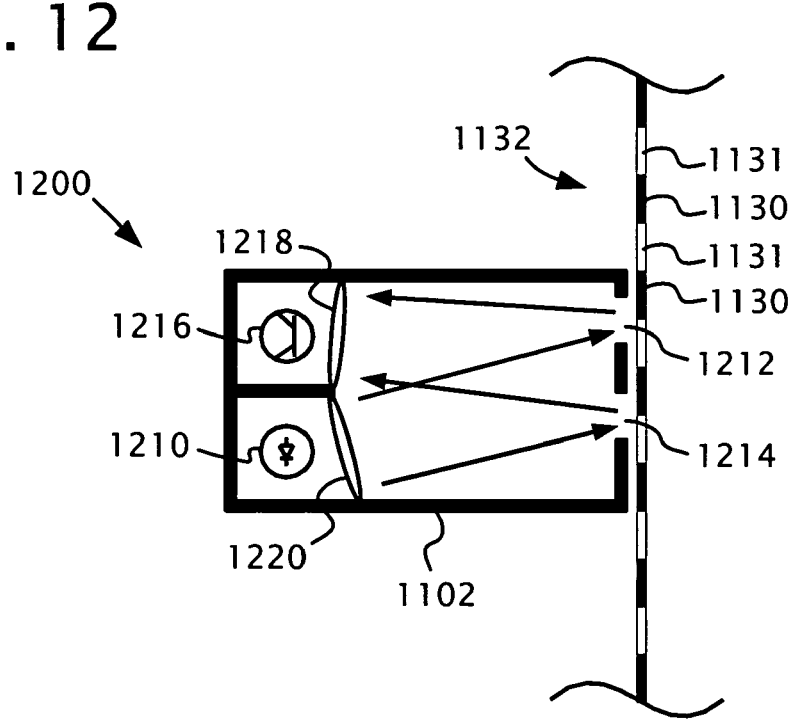
FIG. 12 is a schematic side view of a second exemplary reflective optical sensor as can be used in embodiments of the disclosed grade-rod technology. The second exemplary reflective optical sensor has apertures that are offset from the apertures of the sensor illustrated in FIG. 11.

FIGS. 11 and 12 are schematic side views of a first exemplary reflective optical sensor 1100 (FIG. 11) and a second exemplary reflective optical sensor 1200 (FIG. 12) that can be used as a sensor pair in any of the disclosed grade-rod reader embodiments. In the illustrated embodiment, the second optical sensor 1200 (FIG. 12) has apertures 1212, 1214 (or translucent regions) that are offset relative to the first optical sensor 1100 (FIG. 11). For illustrative purposes, the first exemplary optical sensor 1100 corresponds to the sensor 252 shown in FIG. 2, and the second exemplary optical sensor 1200 corresponds to the sensor 253.

Optical sensor 1100 is housed within an exemplary sensing unit 1102 and comprises a light source 1110 (for example, an LED or laser light source) from which light is emitted (illustrated by the arrows). The light passes through first and second apertures 1112, 1114 and is reflected from the reference surface 1132. In the illustrated embodiment, the centers of the first and second apertures 1112, 1114 are spaced apart from one another by the repeat length of the reference indicators 1130 on the reference surface 1132. In this embodiment, light is reflected from the reference surface 1132 and detected by a detector 1116 (for example, a phototransistor or photodiode). The signal produced by the detector 1116 from the reflected light can be either unconditioned or filtered (or otherwise processed) in order to enhance the signal-to-noise ratio of the reflected light relative to the ambient light. In certain embodiments, one or more lenses 1118, 1120 can be used to better direct the light at the detector 1116 and/or the apertures 1112, 1114. In the illustrated embodiment, the reference indicators 1130 of the reference surface 1132 comprise reflective or nonreflective regions of the reference surface that have a substantially different contrast or reflectivity than adjacent portions 1131 of the reference surface 1132. The reference indicators 1130 can also comprise, for example, regions of the reference surface 1132 that have a different depth or different texture than adjacent regions, and thus produce different reflective characteristics. Thus, the presence of a reference indicator 1130 within the apertures 1112, 1114 (the detection regions of the sensor 1100) affects the characteristics of the reflected light, and also the signal generated by the detector 1116.

Turning now to FIG. 12, sensor 1200 is also housed within the sensing unit 1102 and is substantially identical to the sensor 1100 but has apertures 1212, 1214 that are offset relative to the apertures 1112, 1114 of the sensor 1100. Specifically, the apertures 1212, 1214 shown in FIG. 12 are offset by one quarter of the repeat length of the reference indicators 1130 on the reference surface 1132 (that is, 0.25*l) from the apertures 1112, 1114 of the sensor 1100. Optical sensor 1200 otherwise comprises similar components to optical sensors 1100. For example, the optical sensor 1200 further comprises light source 1210, detector 1216, and lenses 1218, 1220.

Figure 13:
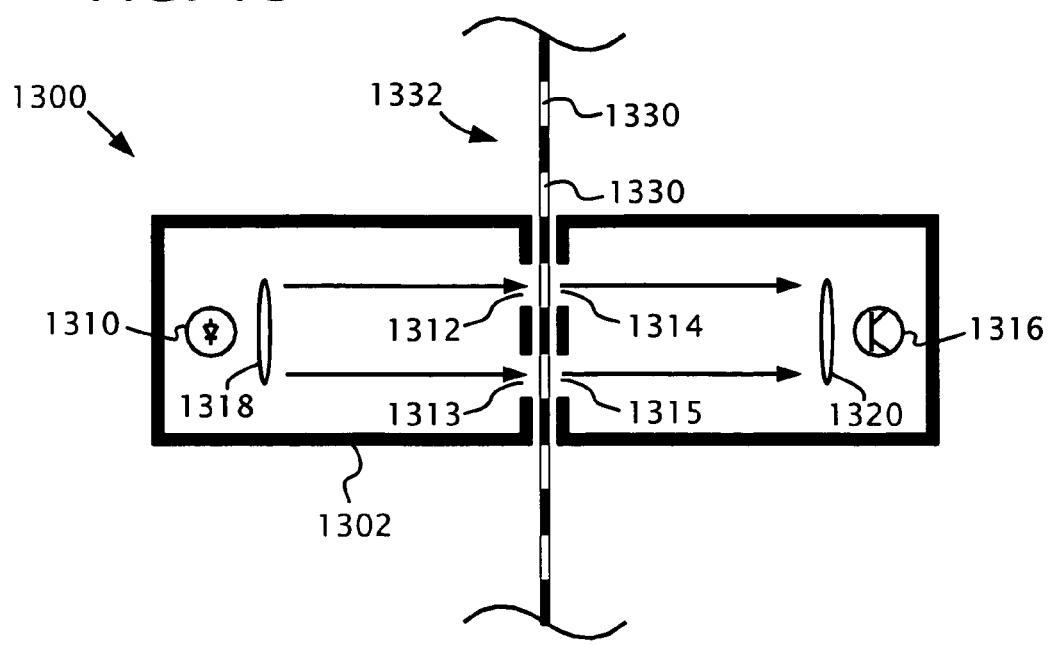
FIG. 13 is a schematic side view of a first exemplary transmissive optical sensor as can be used in embodiments of the disclosed grade-rod technology.
Figure 14:
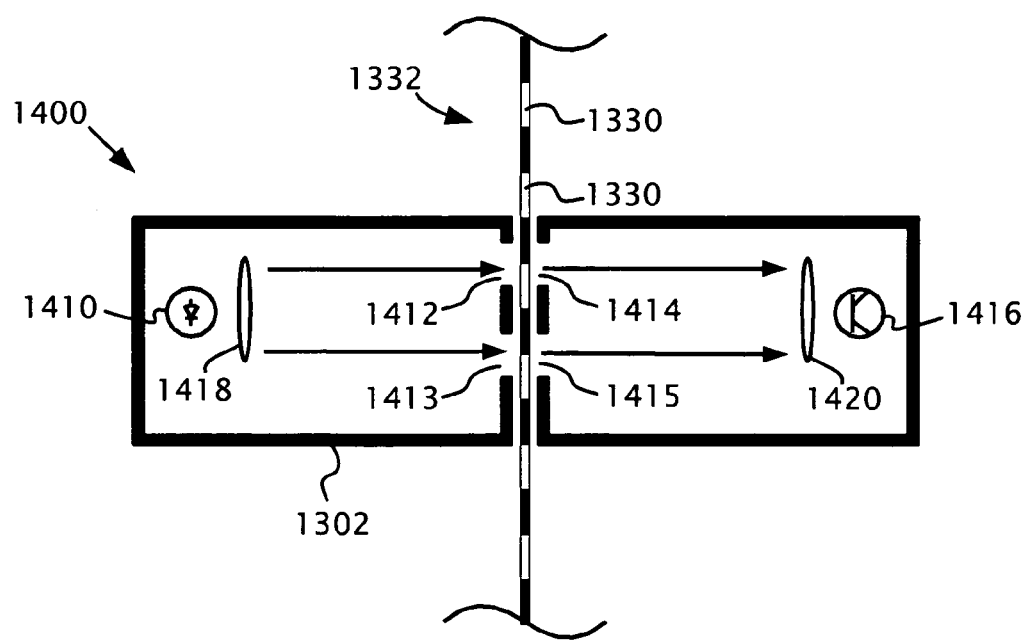
FIG. 14 is a schematic side view of a second exemplary transmissive optical sensor as can be used in embodiments of the disclosed grade-rod technology. The second exemplary transmissive optical sensor has apertures that are offset from the apertures of the sensor illustrated in FIG. 13.

FIGS. 13 and 14 are schematic side views of a first exemplary transmissive optical sensor 1300 (FIG. 13) and a second exemplary transmissive optical sensor 1400 (FIG. 14) that can be used as a sensor pair in any of the disclosed embodiments of grade-rod readers. In the illustrated embodiment, the second optical sensor 1400 has apertures (or translucent regions) that are offset relative to apertures of the first optical sensor 1300. For illustrative purposes, the first exemplary optical sensor 1300 corresponds to the sensor 252 shown in FIG. 2, and the second exemplary optical sensor 1400 corresponds to the sensor 253.

The optical sensor 1300 is housed within the sensing unit 1302. The exemplary optical sensor 1300 illustrated comprises a light source 1310 (for example, an LED or laser light source) that produces light (illustrated by the arrows) transmitted through apertures 1312, 1313 on a first side of a reference surface 1332, through reference indicators 1330 on the reference surface 1332 (which comprise apertures or relatively translucent regions of the reference surface), through apertures 1314, 1315 on a second side of the reference surface 1332, and to a detector 1316. In the illustrated embodiment, the aperture pair 1312, 1312 and the aperture pair 1314, 1315 are spaced apart from one another by the repeat length of reference indicators 1330. In the illustrated embodiment, light is transmitted through the reference surface 1332 and detected by a detector 1316. The signal produced by the detector 1316 from the transmitted light can be either unconditioned or filtered (or otherwise processed) in order to enhance the signal-to-noise ratio of the transmitted light relative to the ambient light. In certain embodiments, one or more lenses 1318, 1320 are used to focus the light.

In FIG. 14, sensor 1400 is also housed within the sensing unit 1302 and is substantially identical to the sensor 1300 but has apertures 1412, 1413, 1414, 1415 that are offset relative to the apertures 1312, 1313, 1314, 1315 of the sensor 1300. Specifically, the apertures 1412, 1413, 1414, 1415 shown in FIG. 14 are offset by one quarter of the repeat length of the reference indicators 1330 on the reference surface 1332 (that is 0.25*l) from respective apertures 1312, 1313, 1314, 1315 of the sensor 1300. Optical sensor 1400 otherwise comprises similar components to the optical sensor 1300. For example, the optical sensor 1400 further comprises light source 1410, detector 1416, and lenses 1418, 1420.

Figure 15:
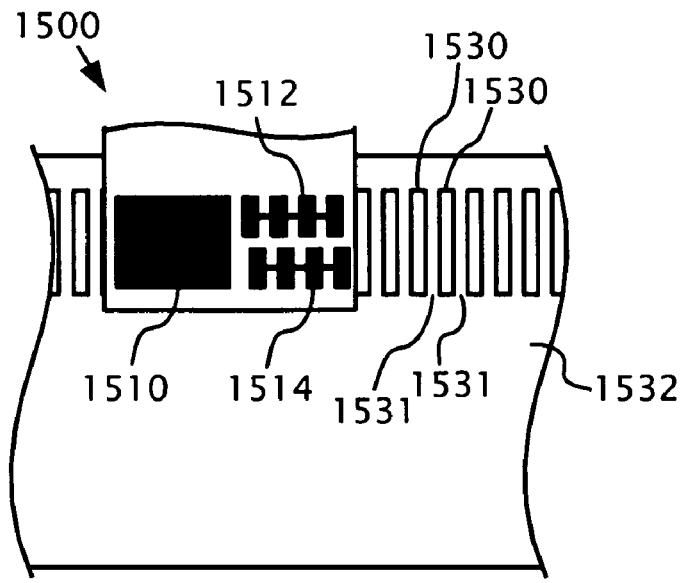
FIG. 15 is a schematic top view of a first configuration of two exemplary offset electromagnetic sensors.
Figure 16:
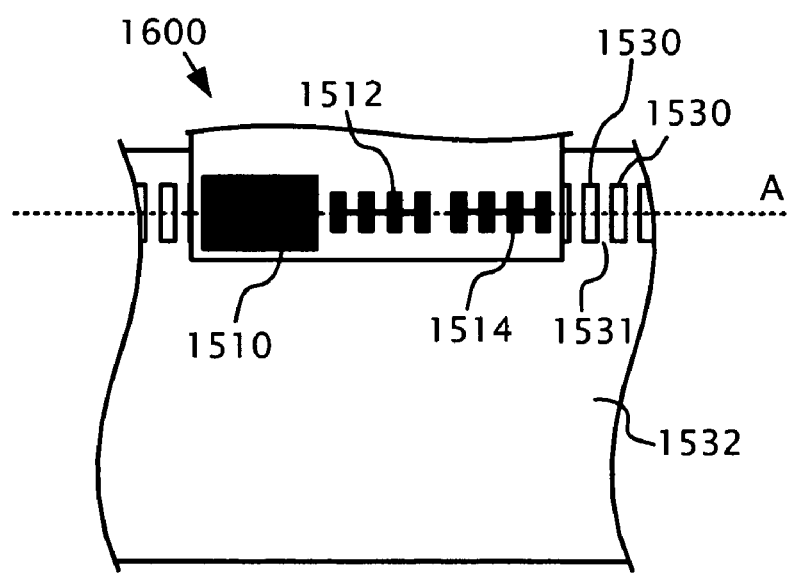
FIG. 16 is a schematic top view of a second configuration of two exemplary offset electromagnetic sensors.

FIGS. 15 and 16 are schematic top views of two exemplary electromagnetic sensor configurations as can be used as a sensor pair to detect reference indicators of a reference surface. In the illustrated embodiments, the reference indicators 1530 comprise regions of a reference surface 1532 having a different degree of capacitive coupling with an active region of the sensors, compared to adjacent regions 1531 of the reference surface 1532. For example, the reference indicators 1530 can be metallic pads, or strips, on the reference surface 1532. (In some embodiments, the pads or strips are coupled to a common conductive element beneath the reference surface.) The reference indicators 1530 can also or alternatively comprise indented or elevated regions of the reference surface 1532, but otherwise be made of the same material as the reference surface 1532 (for example, metal).

In FIGS. 15 and 16, each of electromagnetic sensors 1500, 1600 comprises a passive element 1510, a first active element 1512, and a second active element 1514 (though, in other embodiments, the elements 1512, 1514 can serve as passive elements, whereas the element 1510 can serve as the active element). According to one exemplary embodiment, the passive element 1510 is separated from the first active element 1512 by a distance substantially equal to the distance between adjacent reference indicators (or multiple thereof). Further, the second active element 1514 of this embodiment is offset from the first active element by some fixed distance (for example, n+0.25 l or other suitable offset as described above). The first and second active elements 1512, 1514 can be positioned side-by-side to one another as shown in FIG. 15, or can be positioned along a common longitudinal axis A as shown in FIG. 16.

In the illustrated sensor embodiments, the combination of the first active element 1512 with the passive element 1510 forms a first sensor, and the combination of the second active element 1514 with the passive element 1510 forms a second sensor. In operation, the first and second active elements 1512, 1514 can be coupled to an active electrical signal (for example, an AC signal). In this embodiment, the passive element 1510 serves as either a receiving element or a grounded element. When implemented with the passive element 1510 as a receiving element, the reference indicators are detected by the level of the signal at the receiving element 1510. In such an implementation, the possibility for detecting the wrong corresponding active element 1512, 1514 can be undesirably high. Accordingly, the element 1510 can be used as the active element (for example, coupled to an AC signal) and the elements 1512, 1514 can be used as receiving elements by which the presence of a reference indicator is indicated by a change in the signal level at the respective receiving element 1512, 1514. When the sensors are implemented with the passive element 1510 as a grounded element, the reference indicators are detected by a change in the loading of the active elements 1512, 1514.

Figure 17:
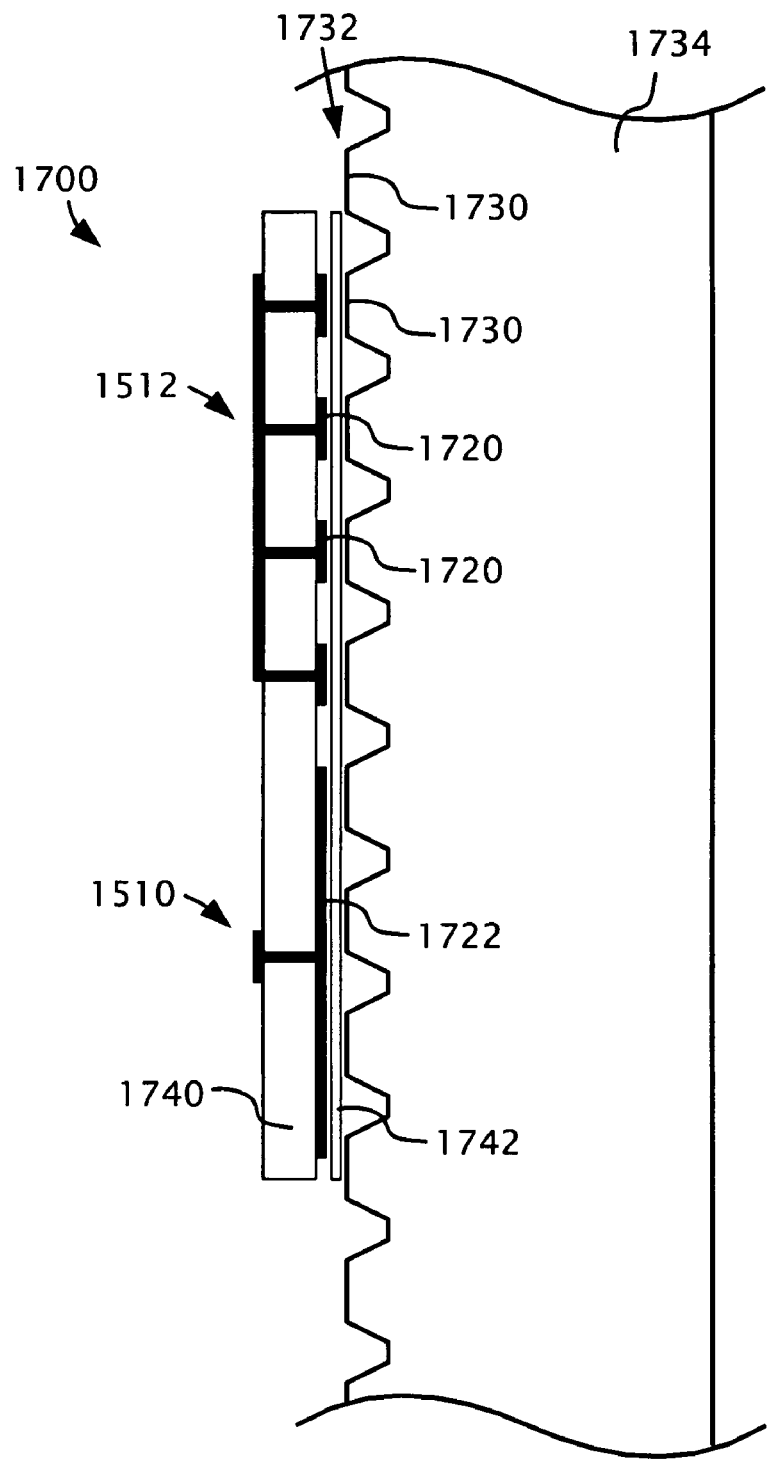
FIG. 17 is a schematic side view of a first exemplary electromagnetic sensor and corresponding reference surface as can be used in embodiments of the disclosed grade-rod technology.
Figure 18:
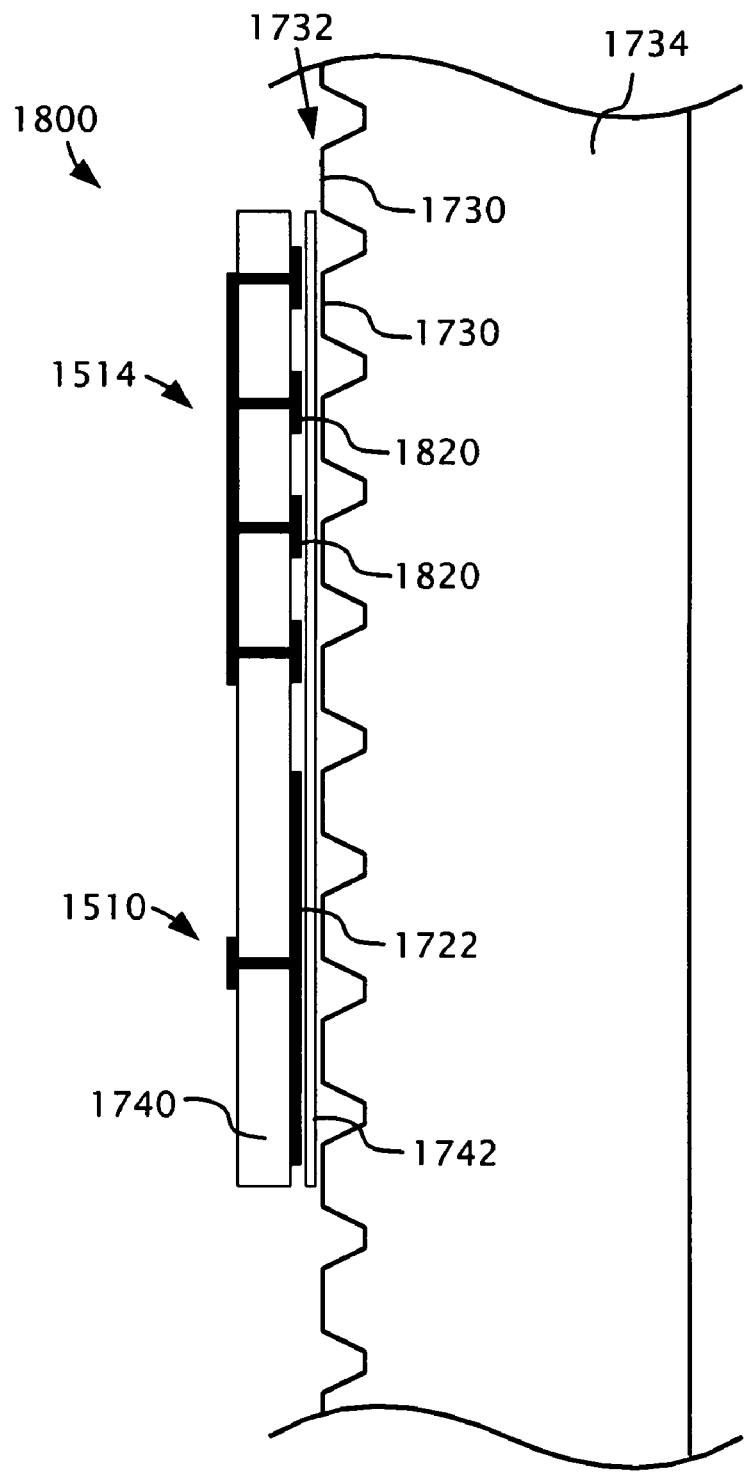
FIG. 18 is a schematic side view of a second exemplary electromagnetic sensor and corresponding reference surface as can be used in embodiments of the disclosed grade-rod reader technology. The second exemplary electromagnetic sensor has active contacts that are offset from the active contacts of the sensor illustrated in FIG. 17.

FIGS. 17 and 18 are schematic side views of a first electromagnetic sensor 1700 (corresponding to the first active element 1512 in combination with the passive element 1510 shown in FIG. 15) and a second electromagnetic sensor 1800 (corresponding to the second active element 1514 in combination with the passive element 1510 shown in FIG. 15), respectively. In the illustrated embodiments, the sensors 1700, 1800 are in electrical communication with reference indicators 1730, which comprise raised portions on a reference surface 1732 of a grade rode 1734.

Referring to FIG. 17, the first electromagnetic sensor 1700 comprises the first active element 1512, which has conductive pads 1720 sized to correspond to the size of the reference indicators 1730. Although four conductive pads 1720 are shown in FIG. 17, the number of the conductive pads can vary from implementation to implementation (for example, one, two, and so on). The passive element 1510 of the illustrated embodiment comprises a single ground pad 1722 sized to extend over one or more reference indicators 1730. In the illustrated embodiment, the first active element 1512 and the passive element 1510 are implemented on a support substrate 1740 (for example, a printed circuit board). The first electromagnetic sensor 1700 further comprises an insulative layer 1742 between the reference indicators 1730 and the conductive pads 1720 and the ground pad 1722. The insulative layer 1742 enables a capacitive coupling to be formed between the pads 1720, 1722 and the reference indicators 1730. For example, as the first electromagnetic sensor 1700 is moved relative to the reference surface 1732, the capacitive coupling between the conductive pads 1720 rises and falls as the distance between the pads 1720 and the reference indicators 1730 varies.

The second electromagnetic sensor 1800 shown in FIG. 18 is substantially identical to the sensor 1700 but has conductive pads 1820 that are offset relative to the conductive pads 1720 of the sensor 1700. Specifically, the conductive pads 1820 shown in FIG. 18 are offset by one quarter of the repeat length of the reference indicators 1730 on the reference surface 1732 (that is 0.25*l) from the conductive pads 1820 of the sensor 1800, but can be offset by another suitable distance. The second electromagnetic sensor 1800 otherwise comprises similar components to the first electromagnetic sensor 1700.

Figure 19:
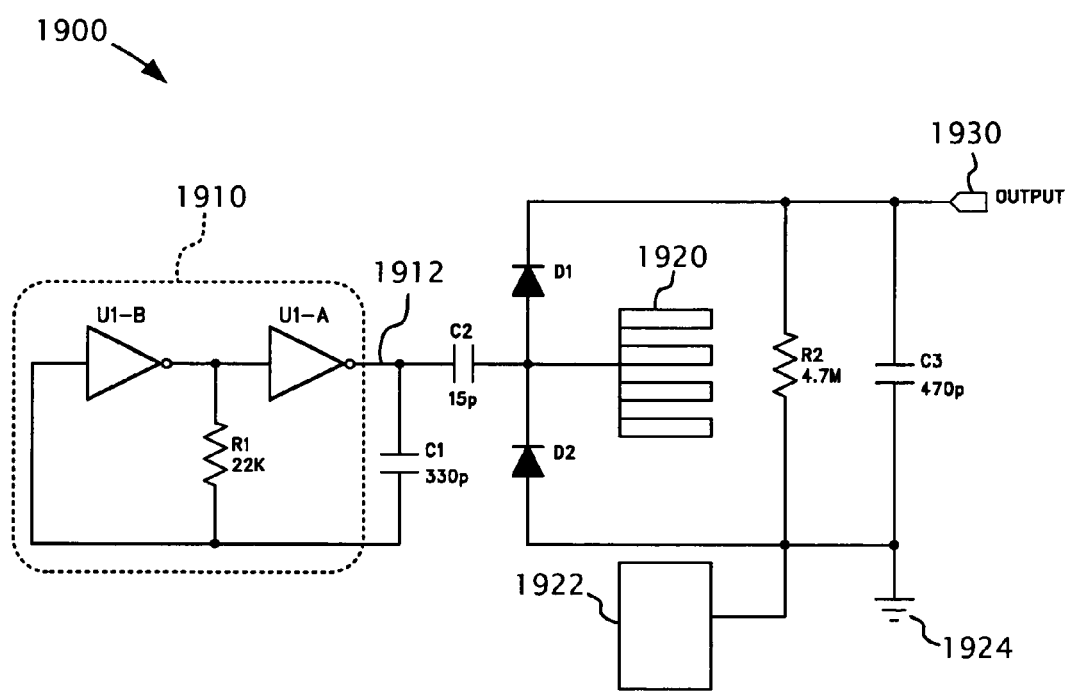
FIG. 19 is a circuit diagram of an exemplary circuit for implementing the sensors illustrated in FIGS. 15 through 18.

FIG. 19 is a circuit diagram schematically showing an exemplary circuit 1900 for implementing the electromagnetic sensors 1700, 1800. The exemplary circuit 1900 should not be construed as limiting in any way, as the sensors 1700, 1800 can be implemented using any of various other circuit configurations. For example, FIG. 19 provides exemplary capacitance and resistance values that can be varied depending on the implementation. An oscillator 1910 (comprising inverters U1-B and U1-A, resistor R1, and capacitor C1) produces an AC signal 1912 and is coupled via a small capacitor C2 to an active element 1920 (corresponding to the first or second active elements 1512, 1514 of FIGS. 15 through 18). In one particular implementation, the inverters U1-B and U1-A are sections of an integrated circuit CMOS inverter (such as the CD4069UB inverter circuit from Texas Instruments). In this particular implementation, the AC signal 1912 is a 80-KHz AC signal, which is rectified by diodes D1 and D2 and smoothed by capacitor C3. A resistor R2 can be used to set the fall time for the resulting DC voltage. Also coupled to the circuit 1900 is a ground element 1922 (corresponding to passive element 1510 of FIGS. 15 through 18) and circuit ground 1924. An output node 1930 that can be coupled to an input of a processing unit is further provided. An output signal at the output node 1930 (such as waveform A in FIG. 9) can be used to determine whether a reference indicator on a reference surface of a grade rod is in the detection region of the active element 1920. For example, and assuming the use of reference indicators as shown in FIGS. 17 and 18, if there is relatively little coupling between the active element 1920 and the ground element 1922, the AC signal through capacitor C2 is relatively unloaded and a relatively high DC voltage (for example, a few volts) will appear at the output node 1930. Alternatively, if the reference indicators of the reference surface are substantially aligned with the active element 1920 and the ground element 1922, the AC signal through capacitor C2 will be coupled to ground and very little voltage will appear at the output node 1930. Thus, as the active element 1920 is moved relative to the reference indicators on the reference surface, the voltage at the output node 1930 will vary from high to low. The circuit used in the offset sensor 1800 can be substantially identical to the circuit 1900 but can share the oscillator 1910. The output node of the circuit for the offset sensor 1800 would typically be coupled to a separate input of the processing unit of the grade-rod reader in order to produce a separate waveform (such as waveform B in FIG. 9) that can be used to determine the direction of movement of the sensors.

It should be understood that the particular electromagnetic sensor configurations described above with respect to FIGS. 15 through 19 should be not be construed as limiting, as any of various other electromagnetic sensor configurations are possible. For example, FIGS. 20 and 21 show an electromagnetic sensor 2000 that forms a direct electrical connection with the reference indicators on a reference surface and can be used with any of the disclosed embodiments or grade-rod readers. The sensor 2000 comprises a first sensor 2010 and a second sensor 2014 offset from the first sensor (for example, by a distance such as 0.25*l or n+0.25*l). The first sensor 2010 comprises a first contact element 2012 and a second contact element 2013 that contact a reference surface 2020 of a grade rod 2022. In this embodiment, reference indicators 2024 of the reference surface 2020 comprise conductive regions (for example, elongated metal strips or bars) disposed at substantially even intervals between relatively nonconductive regions 2026. As the contact elements 2012, 2013 come into contact with a respective reference indicator 2024, the contact elements become electrically shorted to one another. The first sensor 2010 can comprise a circuit driving at least one of the contact elements 2012, 2013 and configured to produce an output voltage at an output node that changes when the two contact elements 2012, 2013 touch a respective reference indicator 2024. The second sensor 2014 likewise comprises contact elements 2016, 2017 that contact the reference surface 2020 at a position offset from the contact elements 2012, 2013 of the first sensor 2010. The second sensor 2014 can likewise comprise a circuit configured to produce an output voltage at an output node indicative of whether the contact elements 2016, 2017 are in contact with a respective reference indicator 2024.

Still other sensor configurations are possible that detect the presence of respective reference indicators in a detection region of the sensor as the grade-rod reader is translated up and down a grade rod. For example, FIGS. 22 through 24 illustrate a combination optical/mechanical sensor that can be used with any of the disclosed grade-rod reader embodiments. In particular, FIG. 22 is a schematic front view of a sensor 2200 comprising a toothed wheel 2210 that contacts and engages a reference surface 2220 of a grade rod. In the illustrated embodiments, and as best shown in the side view of FIG. 24, the reference indicators 2222 of the reference surface 2220 comprise evenly spaced apertures sized to receive the teeth of the wheel 2210 (which can each be considered a detection region of the sensor 2200). Referring again to FIG. 22, the toothed wheel 2210 rotates on an axle 2212 that is attached to a grade-rod reader 2230. An encoder wheel 2214 is also affixed to the axle 2212. As shown in the side view of FIG. 23, the encoder wheel 2214 of the illustrated embodiment comprises radial apertures 2216 evenly distributed about the wheel 2214. An optical sensor unit 2218 is configured to receive a portion of the wheel 2214 in a channel region 2215 of the sensor unit. The optical sensor unit 2218 can comprise, for example, a first sensor and a second sensor angularly offset from the first sensor by a distance sufficient to enable detection of the rotational direction of the encoder wheel 2214. In the illustrated embodiment, each of the sensors can comprise a light source (such as an LED, or laser light source) positioned on one side of the channel region 2215 and configured to emit a beam of light. A detector (such as a photodiode) can be positioned on an opposite side of the channel region 2215 and aligned with the light source. As the grade-rod reader 2230 is moved up and down the reference surface, the rotation of the apertures 2216 causes the beams of light produced by the respective light sources of the sensors to be alternately transmitted to and blocked from the respective detectors of the sensors. In this way, motion of the grade-rod reader 2230 along the reference surface 2220 and the direction of such motion can be detected and analyzed to determine the extent of such motion (for example, by a processing unit coupled to the optical sensor unit 2218).

In view of the many possible embodiments to which the principles of the disclosed technology may be applied, it should be recognized that the illustrated embodiments are only preferred examples of the disclosed technology and should not be taken as limiting the scope of the disclosed technology. Rather, the scope of the disclosed technology is defined by the following claims and their equivalents. We therefore claim all that comes within the scope and spirit of these claims.

What is claimed is:

1. A device for use in surveying, comprising:
   a reader apparatus configured to engage a grade rod such that the reader apparatus can be moved relative to a reference surface of the grade rod;
   an electromagnetic sensor located in a sensor region of the reader apparatus, the electromagnetic sensor being configured to detect electromagnetic couplings periodically formed between the electromagnetic sensor and respective reference indicators disposed on the reference surface as the reader apparatus is moved relative to the reference surface; and
   a processing unit electrically coupled to the electromagnetic sensor, the processing unit being configured to determine an extent of motion of the reader apparatus along the reference surface based at least in part on signals received from the electromagnetic sensor corresponding to the electromagnetic couplings, the processing unit also being configured to convert and display the extent of motion relative to a reference value in a user-selected unit of measure.

2. The device of claim 1, wherein the reader apparatus is configured to engage the grade rod via a tongue-and-groove configuration.

3. The device of claim 1, further comprising a laser-detection system located in a housing of the reader apparatus and configured to detect when a reference laser is incident on a fixed location of the housing.

4. The device of claim 1, further comprising an input device configured to receive the user-selected unit of measure.

5. The device of claim 1, further comprising the grade rod, wherein the grade rod is elongated and has a first end and a second end opposite the first end, and the reference surface extends along at least a portion of the grade rod between the first end and the second end.

6. The device of claim 5, wherein the reference indicators on the reference surface are substantially identical to one another.

7. The device of claim 5, wherein the reference indicators comprise conductive regions evenly distributed on the reference surface.

8. The device of claim 5, wherein the reference indicators comprise raised regions of the reference surface that are relatively closer to the electromagnetic sensor than adjacent regions of the reference surface when the reader apparatus is engaged with the grade rod.

9. The device of claim 5, wherein the electromagnetic sensor is configured to detect capacitive couplings formed between the electromagnetic sensor and the reference indicators on the reference surface, and the reference indicators comprise regions of the reference surface that produce a higher capacitive coupling with a region of the electromagnetic sensor than adjacent regions of the reference surface.

10. The device of claim 5, wherein the reference surface is on tape associated with the grade rod.

11. The device of claim 10, further comprising a laser detector slidably coupled to the grade rod and separate from the reader apparatus.

12. The device of claim 11, wherein the laser detector is attached to a portion of the tape so that movement of the laser detector causes movement of the tape relative to the reader apparatus.

13. The device of claim 1, wherein the electromagnetic sensor is a first electromagnetic sensor, the device further comprises a second electromagnetic sensor located in the sensor region of the reader apparatus, and the second electromagnetic sensor is configured to detect electromagnetic couplings periodically formed with the reference indicators as the reader apparatus is moved relative to the reference surface.

14. The device of claim 13, wherein the first electromagnetic sensor and the second electromagnetic sensor are offset relative to one another.

15. The device of claim 14, wherein the amount of the offset is approximately a quarter of a repeat length between adjacent reference indicators.

16. The device of claim 1, wherein the processing unit is located in the reader apparatus.

17. The device of claim 1, wherein the processing unit is further configured to determine a direction of motion of the reader apparatus relative to the reference surface based at least in part on signals received from the electromagnetic sensor corresponding to the electromagnetic couplings.

18. A device for use in surveying, comprising:
    a reader apparatus configured to engage a grade rod such that the reader apparatus can be moved relative to a reference surface of the grade rod, the reference surface of the grade rod including a plurality of reference indicators;
    an optical sensor located in a sensor region of the reader apparatus, the optical sensor being configured to detect passage of the reference indicators through a detection region of the optical sensor as the reader apparatus is moved relative to the reference surface; and
    a processing unit electrically coupled to the optical sensor, the processing unit being configured to determine an extent of motion of the reader apparatus relative to the reference surface based at least in part on signals received from the optical sensor corresponding to passage of the reference indicators through the detection region, the processing unit also being configured to convert and display the extent of motion relative to a reference value in a user-selected unit of measure.

19. The device of claim 18, further comprising an input device configured to receive the user-selected unit of measure.

20. The device of claim 18, further comprising the grade rod, wherein the grade rod is elongated and has a first end and a second end opposite the first end, and the reference surface extends along at least a portion of the grade rod between the first end and the second end.

21. The device of claim 20, wherein the reference indicators of the reference surface are substantially identical to one another.

22. The device of claim 20, wherein the reference indicators comprise apertures in the reference surface or regions on the reference surface having a substantially different contrast than adjacent regions on the reference surface.

23. The device of claim 20, wherein the reference surface is on tape associated with the grade rod.

24. The device of claim 23, further comprising a laser detector slidably coupled to the grade rod and separate from the reader apparatus.

25. The device of claim 24, wherein the laser detector is attached to a portion of the tape so that movement of the laser detector causes movement of the tape relative to the reader apparatus.

26. The device of claim 18, further comprising a laser-detection system housed within the reader apparatus and configured to detect when a reference laser is incident on the reader apparatus at a fixed location of the reader apparatus.

27. The device of claim 18, wherein the optical sensor is a first optical sensor, the device further comprises a second optical sensor located in the sensor region of the reader apparatus, and the second optical sensor is configured to detect passage of the reference indicators through a detection region of the second optical sensor as the reader apparatus is moved relative to the reference surface.

28. The device of claim 18, wherein the processing unit is located in the reader apparatus.

29. The device of claim 18, wherein the processing unit is further configured to determine a direction of motion of the reader apparatus relative to the reference surface based at least in part on signals received from the optical sensor corresponding to passage of the reference indicators through the detection region.

30. A device for use in surveying, comprising:
a reader apparatus configured to engage a grade rod such that the reader apparatus can be moved relative to a reference surface of the grade rod;
two or more electromagnetic sensors located in a sensor region of the reader apparatus, the two or more electromagnetic sensors being configured to detect electromagnetic couplings periodically formed between the sensors and respective reference indicators disposed on the reference surface as the reader apparatus is moved relative to the reference surface, wherein the electromagnetic sensors each comprise two or more contact elements that physically contact the reference surface and produce a voltage change in the electromagnetic sensors whenever the contact elements touch a reference indicator of the reference surface, the reference indicators comprising regions of the reference surface that have a higher conductivity than adjacent regions of the reference surface; and
the grade rod, wherein the grade rod is elongated and has a first end and a second end opposite the first end, and the reference surface extends along at least a portion of the grade rod between the first end and the second end.

31. A device for use in surveying, comprising:
a reader apparatus configured to engage a grade rod such that the reader apparatus can be moved relative to a reference surface of the grade rod;
two or more electromagnetic sensors located in a sensor region of the reader apparatus, the two or more electromagnetic sensors being configured to detect electromagnetic couplings periodically formed between the sensors and respective reference indicators disposed on the reference surface as the reader apparatus is moved relative to the reference surface; and
the grade rod, wherein the grade rod is elongated and has a first end and a second end opposite the first end, the reference surface extends along at least a portion of the grade rod between the first end and the second end, the reference surface is on tape associated with the grade rod, the grade rod comprises a front rod section and a rear rod section, and the front rod section is movable relative to the rear rod section so that the overall length of the grade rod can be extended.

32. The device of claim 31, wherein moving the front rod section relative to the rear rod section causes the tape to move relative to the reader apparatus.

33. A device for use in surveying, comprising:
a reader apparatus configured to engage a grade rod such that the reader apparatus can be moved relative to a reference surface of the grade rod, the reference surface of the grade rod further including a plurality of evenly displaced reference indicators;
two or more optical sensors located in a sensor region of the reader apparatus and positioned adjacent a portion of the reference surface, the two or more optical sensors being configured to detect passage of one or more of the reference indicators through respective detection regions of the optical sensors as the reader apparatus is moved relative to the reference surface, wherein the optical sensors are transmissive optical sensors, and the reference indicators comprise regions of the reference surface that are at least partially translucent to a reference light; and
the grade rod, wherein the grade rod is elongated and has a first end and a second end opposite the first end, and the reference surface extends along at least a portion of the grade rod between the first end and the second end.

34. A device for use in surveying, comprising:
a reader apparatus configured to engage a grade rod such that the reader apparatus can be moved relative to a reference surface of the grade rod, the reference surface of the grade rod further including a plurality of evenly displaced reference features;
two or more optical sensors located in a sensor region of the reader apparatus and positioned adjacent a portion of the reference surface, the two or more optical sensors being configured to detect passage of one or more of the reference features through respective detection regions of the optical sensors as the reader apparatus is moved relative to the reference surface; and
the grade rod, wherein the grade rod is elongated and has a first end and a second end opposite the first end, the reference surface extends along at least a portion of the grade rod between the first end and the second end, the reference surface is on tape associated with the grade rod, the grade rod comprises a front rod section and a rear rod section, and the front rod section is movable relative to the rear rod section so that the overall length of the grade rod can be extended.

35. The device of claim 34, wherein moving the front rod section relative to the rear rod section causes the tape to move relative to the reader apparatus.

* * * * *